United States Patent [19]

Volponi et al.

[11] Patent Number: 5,481,648
[45] Date of Patent: Jan. 2, 1996

[54] FUZZY LOGIC METHOD AND APPARATUS FOR CHANGING THE POSITION OF TURBINE BLADES VIA AN INDUCTION MOTOR, BRAKE AND A POSITION LOCK.

[75] Inventors: Allan J. Volponi, West Simsbury; Jason B. Solomonides, West Hartford, both of Conn.

[73] Assignee: United Technologies Corp., Hartford, Conn.

[21] Appl. No.: 172,396

[22] Filed: Dec. 23, 1993

[51] Int. Cl.⁶ .............................. G06F 15/18; G06F 9/44; G05B 13/02
[52] U.S. Cl. .................... 395/51; 395/3; 395/61
[58] Field of Search .............................. 187/127; 416/46, 416/61, 153, 155; 395/3, 11, 51, 61, 900, 50

[56] References Cited

U.S. PATENT DOCUMENTS

| | | | |
|---|---|---|---|
| 5,161,948 | 11/1992 | Carvalho et al. | 416/46 |
| 5,183,387 | 2/1993 | Huggett et al. | 416/147 |
| 5,191,638 | 3/1993 | Wakami et al. | 395/51 |
| 5,199,850 | 4/1993 | Carvalho et al. | 416/153 |
| 5,205,712 | 4/1993 | Hamilton | 416/155 |
| 5,211,539 | 5/1993 | McCarty | 416/61 |
| 5,219,042 | 6/1993 | Sattar et al. | 187/127 |
| 5,243,155 | 9/1993 | Sirag, Jr. | 187/127 |
| 5,243,687 | 9/1993 | Ando et al. | 395/3 |
| 5,261,036 | 11/1993 | Nakano et al. | 395/61 |

OTHER PUBLICATIONS

Yamakawa, "A fuzzy inference engine in nonlinear analog mode and its application to a fuzzy logic control"; IEEE Transactions on Neural Networks, vol. 4, iss. 3, pp. 496–522, May 1993.
Morisue et al., "A sukperconducting fuzzy procesor"; IEEE International Conference on Fuzzy Systems, pp. 443–450, 8–12 Mar. 1992.

*Primary Examiner*—David K. Moore
*Assistant Examiner*—Turiq Hafiz
*Attorney, Agent, or Firm*—Francis J. Maguire

[57] ABSTRACT

Three separate fuzzy rule sets are applied to three corresponding fuzzy sets developed from various input parameters for providing a pitch engagement/mode selection management system and method for requesting disablement of a blade lock, for disabling such lock when the torque available matches the torque required, and for selecting a motor or brake for creating a differential speed between a rotating pitch change mechanism and a fan shaft of a turbine engine. A fuzzeresis rule set is disclosed for stabilizing the motor/brake mode selection fuzzy logic output.

8 Claims, 19 Drawing Sheets

Position Lock Disable Request Logic
| Rule | Position Lock Status | ΔB Command | Differential Rotor Speed | Time Unlocked | B Error | Position Lock Disable Request |
|---|---|---|---|---|---|---|
| 1 | Locked | Small | | | | OFF |
| 2 | Locked | Not Small | | | | ON |
| 3 | Unlocked | Not Small | | | | ON |
| 4 | Unlocked | Small | Small | Long | | OFF |
| 5 | Unlocked | | | Short | | ON |
| 6 | Unlocked | Small | Not Small | | | ON |
| 7 | Locked | | | | Not Small | ON |
| 8 | Unlocked | | | Long | Not Small | ON |
| 9 | Unlocked | | | Very Long | | OFF |
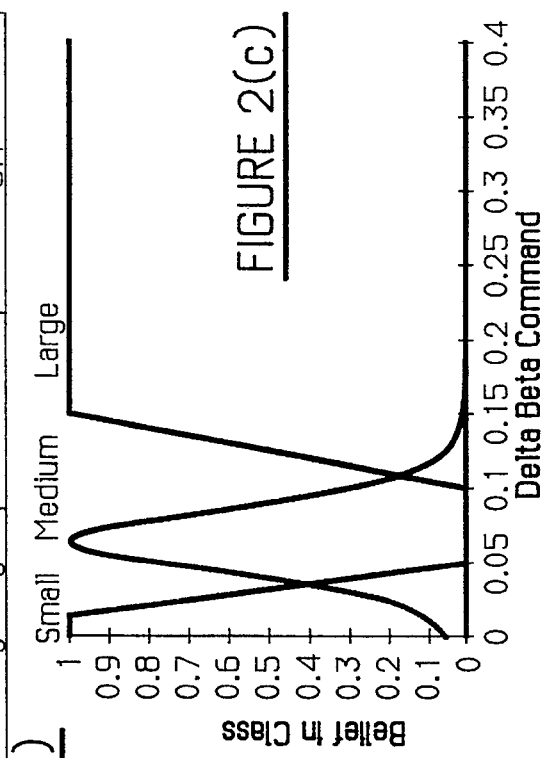
FIGURE 2(a)
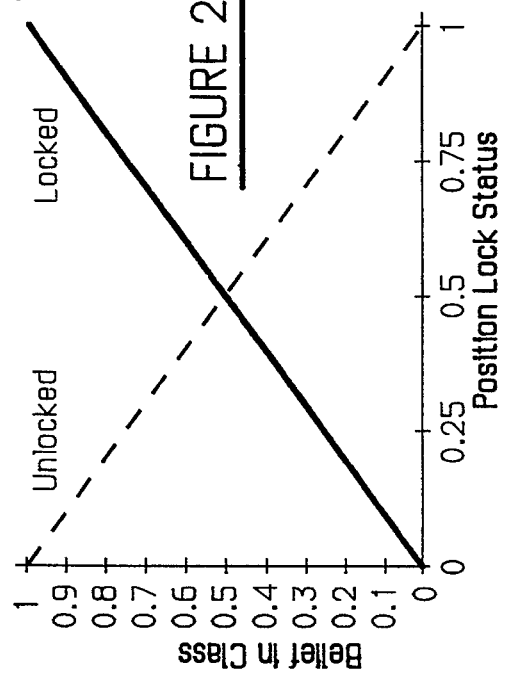
FIGURE 2(b)
FIGURE 2(c)

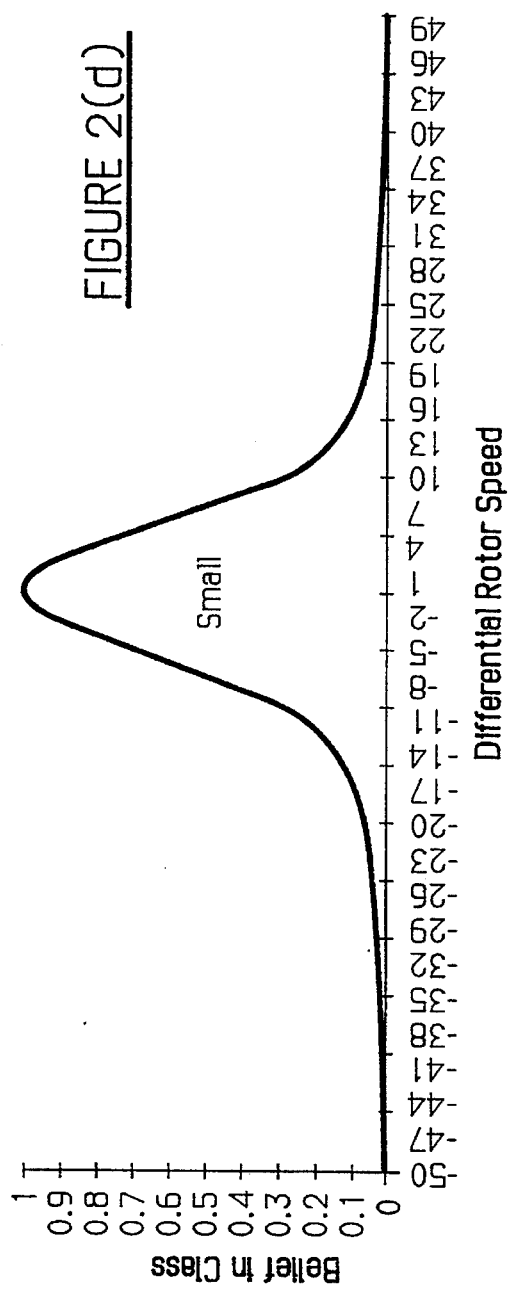
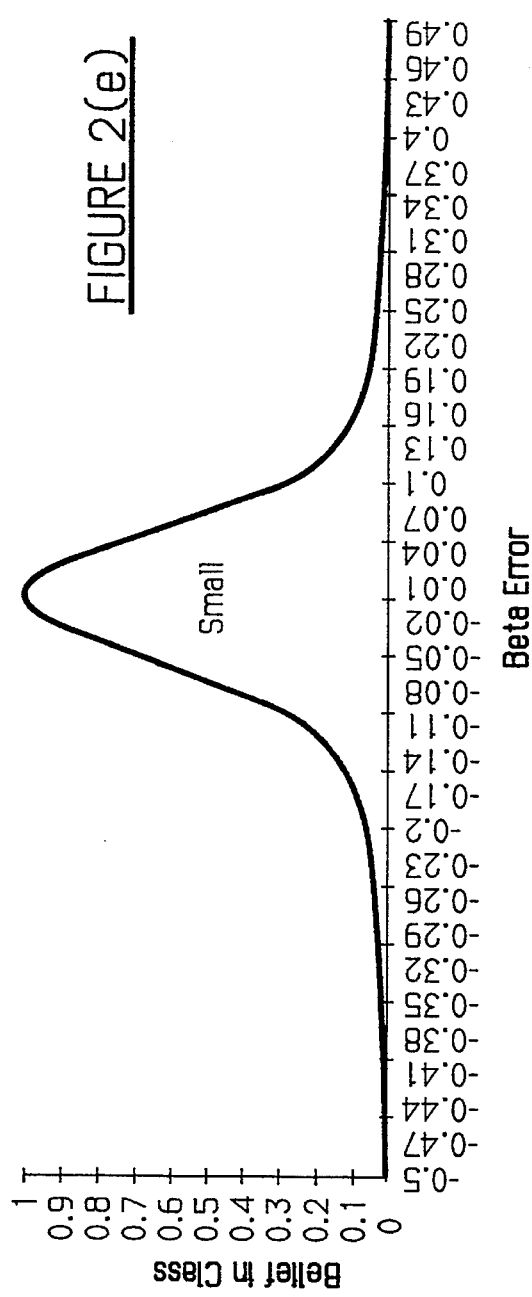

Position Lock Disable Request Logic

| Rule | Input Parameters | | | | Output Parameters |
|---|---|---|---|---|---|
| | Required Torque | ΔB Command | Time Unlocked | Position Lock Disable Request | Available Torque | Position Lock |
| 1 | Positive | Negative | | ON | Zero | OFF |
| 2 | | Negative | | ON | Positive | OFF |
| 3 | Zero | Negative | | ON | Zero | OFF |
| 4 | Negative | Positive | | ON | Zero | OFF |
| 5 | | Positive | | ON | Negative | OFF |
| 6 | Zero | Positive | | ON | Zero | OFF |
| 7 | | | Long | ON | | OFF |
| 8 | | | | OFF | | ON |

FIGURE 3(a)

Motor/Brake Mode Selection Logic

| Rule | Input Parameters | | | Output Parameters |
|---|---|---|---|---|
| | Rate Error | Fan Speed | Rotor Speed | Device |
| 1 | | Low | | Motor |
| 2 | | High | Minimal | Motor |
| 3 | Positive | High | Negative | Brake |
| 4 | Negative | High | Positive | Brake |
| 5 | Positive | High | Positive | Motor |
| 6 | Negative | High | Negative | Motor |

FIGURE 4(a)

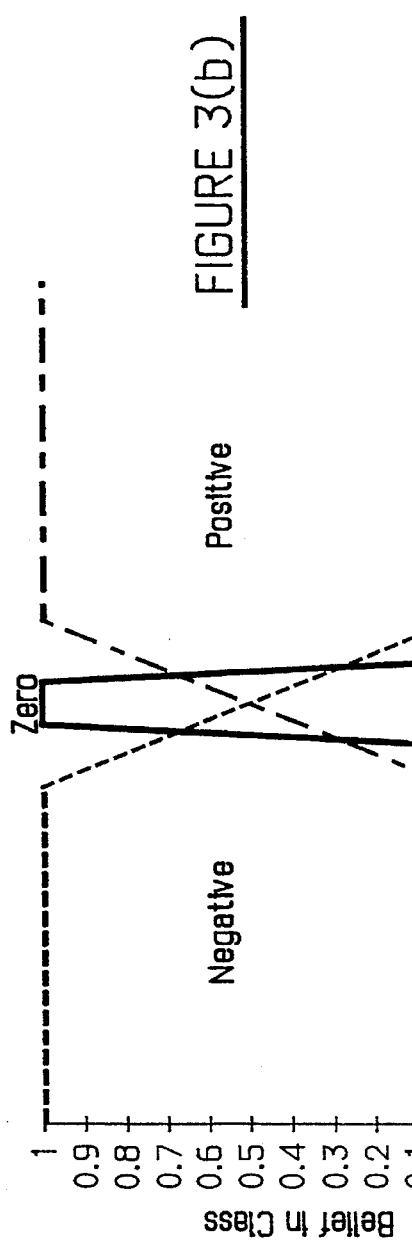
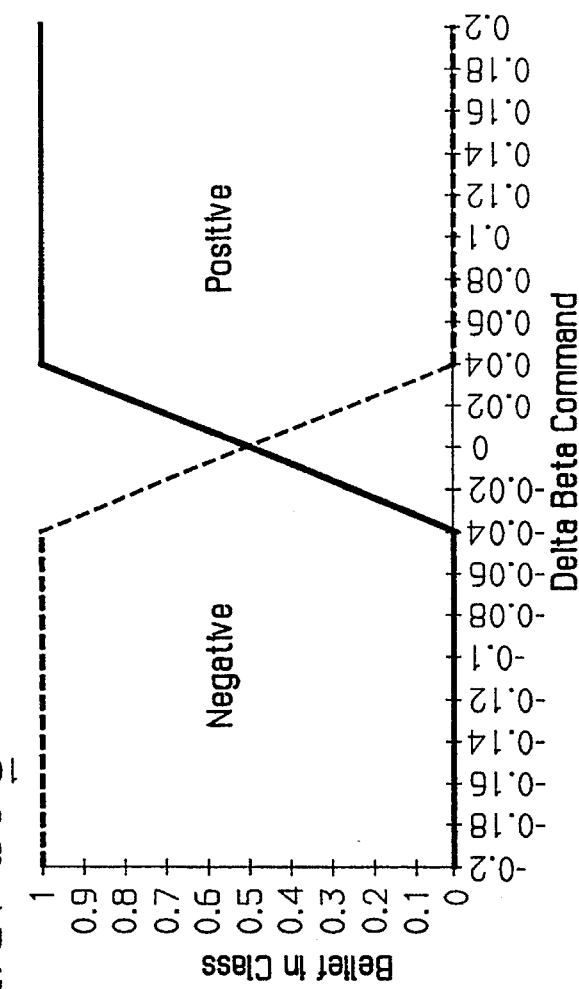
FIGURE 3(b)
FIGURE 3(c)

FUZZeresis Ruleset
|  |  | Rules | | | | | |
|---|---|---|---|---|---|---|---|
|  |  | 1 | 2 | 3 | 4 | 5 | 6 |
| X | Changing |  |  | ✓ | ✓ | ✓ | ✓ |
|  | Not Changing | ✓ | ✓ |  |  |  |  |
|  | ON |  | ✓ | ✓ |  | ✓ |  |
|  | OFF | ✓ |  |  | ✓ |  | ✓ |
| Y_old | ON |  |  |  | ✓ | ✓ |  |
|  | OFF |  |  | ✓ |  |  | ✓ |
| Y |  | OFF | ON | OFF | ON | ON | OFF |
FIGURE 5(a)
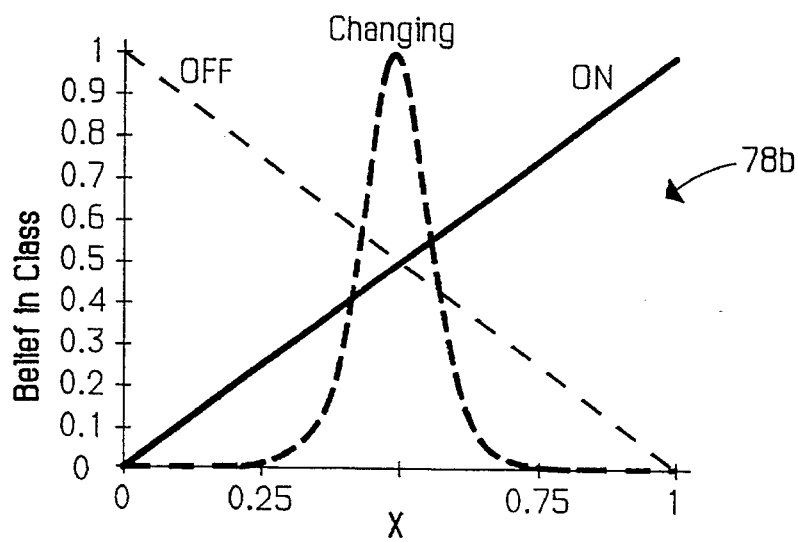
FIGURE 5(b)
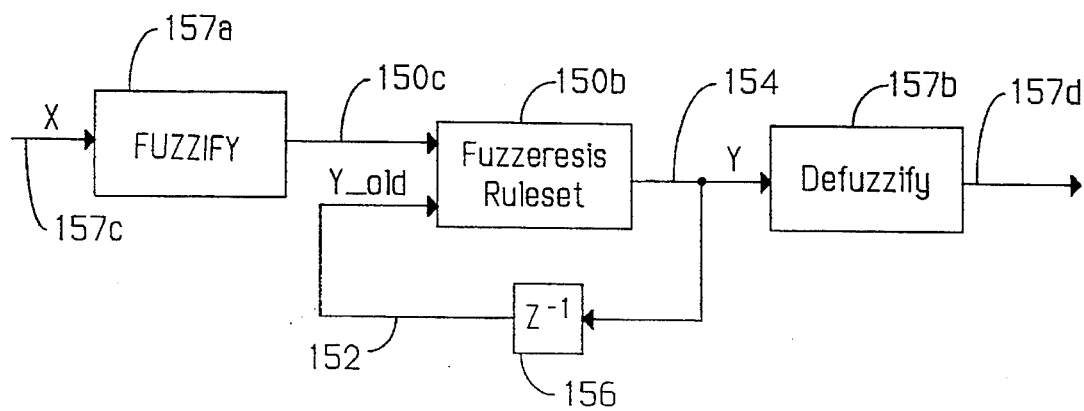
FIGURE 5(c)

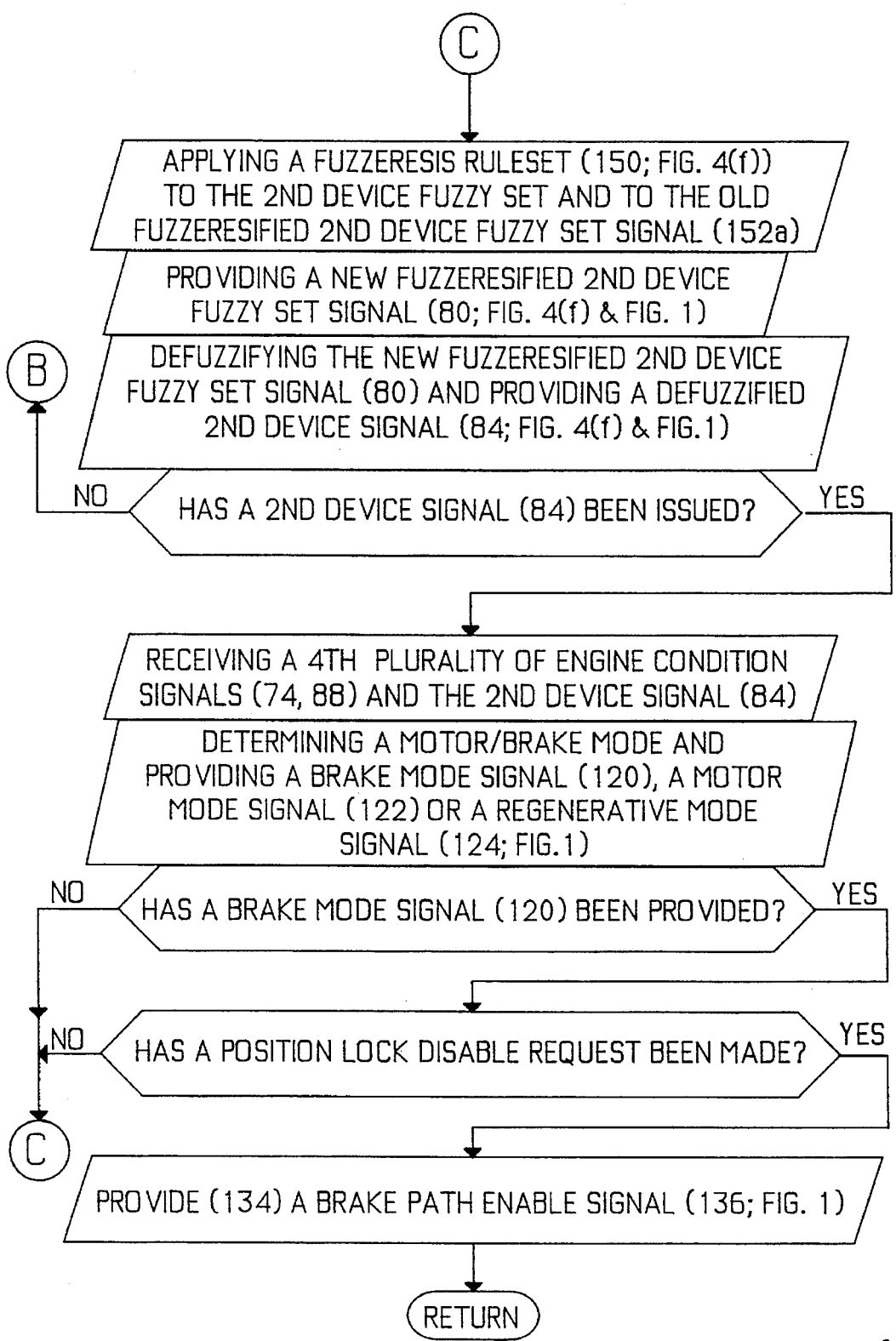

FUZZY LOGIC METHOD AND APPARATUS FOR CHANGING THE POSITION OF TURBINE BLADES VIA AN INDUCTION MOTOR, BRAKE AND A POSITION LOCK.

CROSS-REFERENCE TO RELATED APPLICATION

This disclosure discloses subject matter which may be disclosed and claimed in patent application U.S. Ser. No. 08/173,526 entitled "Propellor Pitch Change Mechanism with Inductive Brake Motor", filed on even date herewith, and owned by the Assignee hereof.

TECHNICAL FIELD

This invention relates to a system for adjusting the pitch of the blades of a variable-pitch propulsor system of the type suitable for use on propulsor-driven aircraft, such as a ducted fan-type propulsor driven by a turbine engine and, more particularly, to a control for such a system having discrete fan blade pitch positions.

BACKGROUND OF THE INVENTION

Variable-pitch propulsor systems having a plurality of propulsor blades rotatably mounted to a rotary hub driven by the aircraft engine are known to be operatively connected to a mechanical, hydro-mechanical or even electrical blade pitch change actuation system disposed in an interior chamber within the hub. One type of pitch change system, commonly referred to as a linear actuation system, is disclosed, for example, in commonly-assigned U.S. Pat. Nos. 4,753,572; 4,936,746; 5,199,850; and 5,161,948. In such linear systems, rotation of a ball screw actuator causes a nut threaded thereabout to translate either forwardly or rearwardly along the ball screw, depending upon the direction of rotation of the ball screw. The ball screw nut is integral to a surrounding yoke, which is operatively connected to each of the blades through a plurality of articulating links, each of which connects to a rotatable trunnion in which a blade is mounted, such that translation of the yoke is converted to a rotation of each blade about its longitudinal axis. The pitch change actuator is typically driven by selectively activating a hydraulic or electric drive mechanism which serves to rotate the pitch change actuator relative to the rotating hub so as to create a differential motion and effect a rotation of each of the blades within their individual hub sockets about their longitudinal axes, thereby changing the pitch setting of the blade.

Blade pitch mechanisms actuated by electrical machines are shown in U.S. Pat. Nos. 5,183,387; 5,205,712; and 5,211,539, for example. In U.S. Pat. No. 5,183,387, a pair of electrical machines cause a relative displacement between corresponding movable input means to a mechanical actuator for actuating the blades. The first movable input means has the rotor of the first electrical machine attached thereto, while the second machine has its rotor attached to the second movable input means. Their stators are held stationary with respect to the rotors. Controllers provide excitation currents to selected windings of the stators to cause the relative displacement.

In U.S. Pat. No. 5,205,712, three electrical machines are used. A compound, polyphase AC reversible induction motor is controlled by excitation of one or the other of two separately excited polyphase alternating current generators. The reversible motor has a double winding that can be excited by one of the other.

A not-publicly known pitch change mechanism of assignee uses two inductive brakes, one for increased pitch and one for decreased pitch. This concept has its limitations, which are described in the above-referenced copending patent application filed on even date herewith, which problems are overcome by using two inductive machines, one brake and one motor connected to a single rotor assembly. The rotor assembly is connected to the ball screw gear train via a single feed-through gear. The brake is implemented as a unidirectional, DC induction machine that is very good at high speeds because of its high torque for slowing down the rotor. For low speeds, the bidirectional motor is implemented as an AC induction motor for low-speed, moderately high torque or low torque purposes.

In the particular implementation disclosed in the above-cited copending application filed on even date herewith, the ball screw-driven actuation system is designed to accurately control and maintain discrete fan blade pitch positions for a high bypass turbo fan engine. This system actually incorporates two electromagnetic devices, an AC induction motor and a DC induction brake for controlling the blade pitch variation. A solenoid-driven pitch lock mechanism may be used as the lock mechanism at the discrete positions.

The induction motor and brake rotors are mechanically locked to each other via a common rotor assembly and are mounted around and electro-mechanically linked to the engine fan output shaft. Under steady-state conditions, this linkage is normally locked, thus allowing the motor/brake rotor assembly to rotate at the same speed as the fan shaft. When a change in blade pitch is desired, the appropriate electromagnetic machine is selected and energized, torque equilibrium is established at the rotor assembly, and the pitch lock mechanism (a solenoid-driven disc brake at the rotor) is disengaged from the fan shaft by applying solenoid power. The resulting differential speed between the rotor assembly and fan output shaft is converted to blade pitch rotation via a feed-through gear, a ball screw/ball nut gear train and blade trunnion linkages. When pitch position is achieved, the pitch lock mechanism is re-engaged, power to the two induction machines is removed, and the rotor assembly once again resumes rotation at fan shaft speed until the next command for pitch change is issued by an engine controller.

This particular implementation places a substantial challenge to classically-derived control algorithms, as it requires that: 1) the motor/brake rotor assembly be disengaged and re-engaged within hardware capabilities, while simultaneously meeting position accuracy requirements; and 2) a scheme exist for selecting and energizing the appropriate induction machine for the proper duration and dynamic condition.

DISCLOSURE OF INVENTION

An object of the present invention is to provide a practical control for coordinating pitch engagement and selection between a motor and a brake for controlling blade pitch in a turbo fan engine.

According to the present invention, a first plurality of engine command and condition signals are fuzzified into a corresponding first plurality of engine command and condition fuzzy set signals and are operated upon by a first plurality of fuzzy rules in order to provide a position lock disable request fuzzy set signal, which is then defuzzified to provide a crisp position lock disable request signal. Either the fuzzy position lock disable request signal or the defuzzified, crisp position lock disable request signal is provided, along with a second plurality of engine condition signals, for fuzzification into a second corresponding plurality of engine condition fuzzy set signals. A second plurality of fuzzy rules are applied to the second plurality of engine condition fuzzy set signals and a position lock disable fuzzy set signal is provided after application of the rules. This signal is defuzzified, and a crisp position lock disable signal is provided. Finally, a third plurality of engine condition signals are fuzzified to provide a corresponding third plurality of engine condition fuzzy set signals which are operated on by a third plurality of fuzzy rules for providing a device fuzzy set signal. The device fuzzy set signal may be defuzzified directly to provide a crisp device signal subjected to a fuzzeresis process that first provides a fuzzy set that is operated on by a fuzzeresis rule set in order to provide a fuzzeresified device output fuzzy set signal that may then be defuzzified to provide another crisp device signal that has been protected against noise.

In still further accord with the present invention, after providing the crisp device signal, a fourth plurality of engine condition signals are taken into account, along with the crisp device signal, for providing a brake mode signal, a motor mode signal or a generator mode signal. In combination with the position lock disable request signal, either a brake path enable signal or a motor path enable signal is then provided.

The present invention provides a heuristic and elegant solution to what would otherwise be an extremely complicated task which would be extremely difficult to carry out using classical logical techniques. The hierarchical fuzzification and fuzzy rule sets disclosed herein provide a new way to control blade pitch in a turbine engine.

These and other objects, features and advantages of the present invention will become more apparent in light of the detailed description of a best mode embodiment thereof, as illustrated in the accompanying drawing.

BRIEF DESCRIPTION OF THE DRAWING

FIG. 2(a) shows some fuzzy rules for determining a position lock disable request output.

FIG. 2(b) shows a fuzzy set for fuzzifying the position lock status signal.

FIG. 2(c) shows a fuzzy set for fuzzifying the delta-beta command signal.

FIG. 2(d) shows a fuzzy set for fuzzifying the differential rotor speed signal.

FIG. 2(e) shows a fuzzy set for fuzzifying the beta error signal.

FIG. 3(a) shows a set of fuzzy rules for determining a position lock output.

FIG. 3(b) shows a fuzzy set for fuzzifying a required torque input signal.

FIG. 3(c) shows a fuzzy set for fuzzifying a delta-beta command signal.

FIG. 4(a) illustrates a set of fuzzy rules for determining mode selection.

FIG. 5(a) shows a fuzzeresis rule set.

FIG. 5(b) shows a fuzzy set for fuzzifying an input signal to be fuzzeresified.

FIG. 5(c) shows the fuzzeresis process in general.

FIGS. 9(a)–9(d) show steps that may be carried out on the hardware of FIGS. 7 and 8, according to the invention.

BEST MODE FOR CARRYING OUT THE INVENTION

Figure 1:
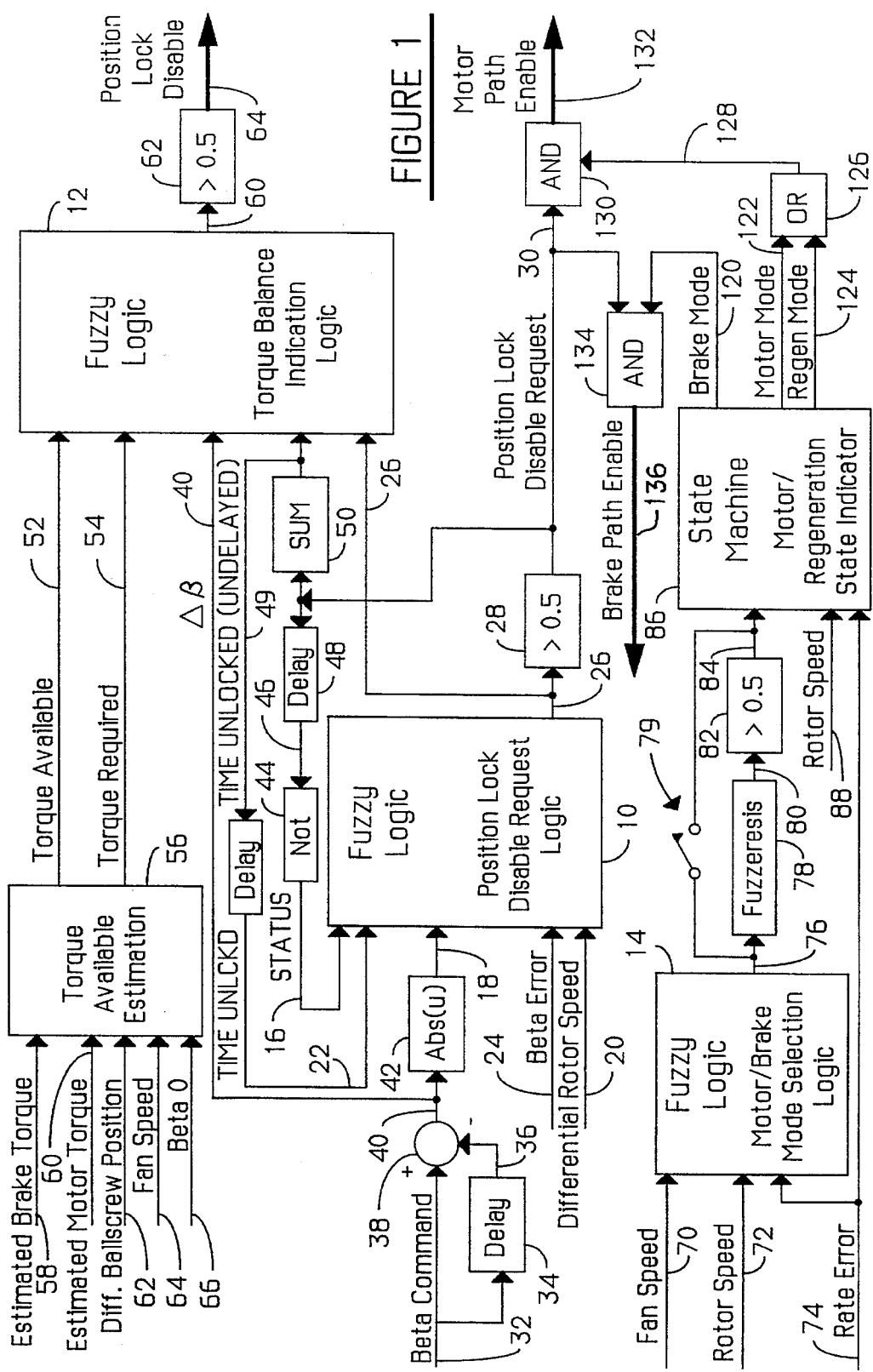
FIG. 1 shows a fuzzy logic-based electro-mechanical pitch engagement/mode selection management system, according to the present invention.

A hierarchical fuzzy logic system for commanding the engagement and disengagement of the motor/brake rotor assembly locking mechanism of the above-mentioned copending patent application filed on even date herewith, and a fuzzy logic selector for determining which inductive machine should be active during various blade pitch excursions is shown in FIG. 1. The above-referenced copending patent application discloses the optimization of engine performance which provides the ability to set a proper relationship between engine operating conditions and fan blade pitch, as well as enabling the engine to develop reverse thrust without a conventional thrust reversor. The system is designed to maximize engine performance at at least two discrete blade positions for forward thrust operating conditions, including a first position for idle and takeoff operating conditions and a second position that provides maximum efficiency for cruise operation; it may also include a reverse thrust position and a feather or zero thrust position.

The differential rotation required to create the pitch change is created magnetically by two electrical induction machines or motors which are located near the center line of the engine, concentric to the fan disc drive. Each induction machine comprises a stator, mounted in the non-rotating part of the engine, and a rotor. The rotors are mounted on a rotor shaft which is geared to the ball screw.

Although physically similar, the two induction machines have been optimized for different modes of operation to minimize the electrical power requirements of the system. These modes of operation consider direction and magnitude of blade loads, engine speed and instantaneous fan blade position. The two machines are used individually to produce the desired change in pitch. One induction machine has been implemented as a unidirectional, DC induction brake designed to operate at conditions for which the fan blades generate forward thrust and the blade loads and engine speeds are high. The other machine has been implemented as a bidirectional, AC induction motor designed to operate at any fan blade position for conditions in which the blade loads and engine speed are both relatively low.

In order to maintain the selected blade pitch, the fan disc and rotor shaft are locked together. This is accomplished by a solenoid-operated position lock. The locking or resistive torque is produced by friction surfaces and can lock the system at any position within the operating range. In its de-energized state, the lock is spring-loaded in the locked position. Solenoid excitation is only required to release the lock when a change in pitch is commanded by the control system.

Once the blades have been actuated to the required position by the induction machines, the solenoid is de-energized to lock the position. There is no electrical power required once the blades are in position.

In flight, the blade position is limited to the range of forward thrust positions. This is accomplished by a fixed stop near the minimum pitch or idle position and a movable stop which limits maximum pitch in the forward thrust range. Upon selection of reverse thrust after landing, the movable stop is hydraulically shifted to allow rotation of the blades to the reverse position.

FIG. 1 shows three separate fuzzy logic blocks 10, 12, 14, corresponding to a position lock disable request fuzzy logic block 10, a torque balance indication fuzzy logic block 12 and a motor/brake mode selection fuzzy logic block 14. Each of these blocks 10, 12, 14 is responsive to "crisp" input signals which are fuzzified, subjected to rules and defuzzified before providing "crisp" output signals. Fuzzy logic is a branch of mathematics closely related to basic set theory and logic. Fuzzy logic involves using sets having basis elements which are only partially contained in the sets. For example, whereas a traditional set C may be defined as {x, y, z}, a fuzzy set F can be defined as {0.3|x, 0.7|y, 0.1|z} wherein the numbers which precede the vertical bars indicate the degree of membership of basis elements x, y and z. The quantity 0.3 x is called a term of the fuzzy set. The basis elements x, y and z can represent numeric or non-numeric quantities. In cases where the basis elements x, y and z represent numbers, the basis element or the value of a term is simply the numerical quantity represented by x, y or z. A crisp value is any value or system of values which does not employ fuzzy logic. A thorough discussion of fuzzy logic can be found in Schmucker, K. J., *Fuzzy Sets, Natural Language Computations, and Risk Analysis,* Computer Science Press, Rockville Md., 1984.

Although the discussion hereinafter explains the fuzzy rule sets in general terms, for teaching purposes, it should be realized that those of skill in the art will be able to utilize these teachings to create implementation details for carrying out the fuzzy logic concept shown in connection with each of the fuzzy logic blocks 10, 12, 14 below. These implementations can be automated by tools which translate high-level fuzzy logic statements into compilable computer code. One such development tool is the Togai Fuzzy C Development System, manufactured by Togai Infralogic Inc. of Irvine, Calif., which converts fuzzy logic statements into compilable C code.

Figure 7:
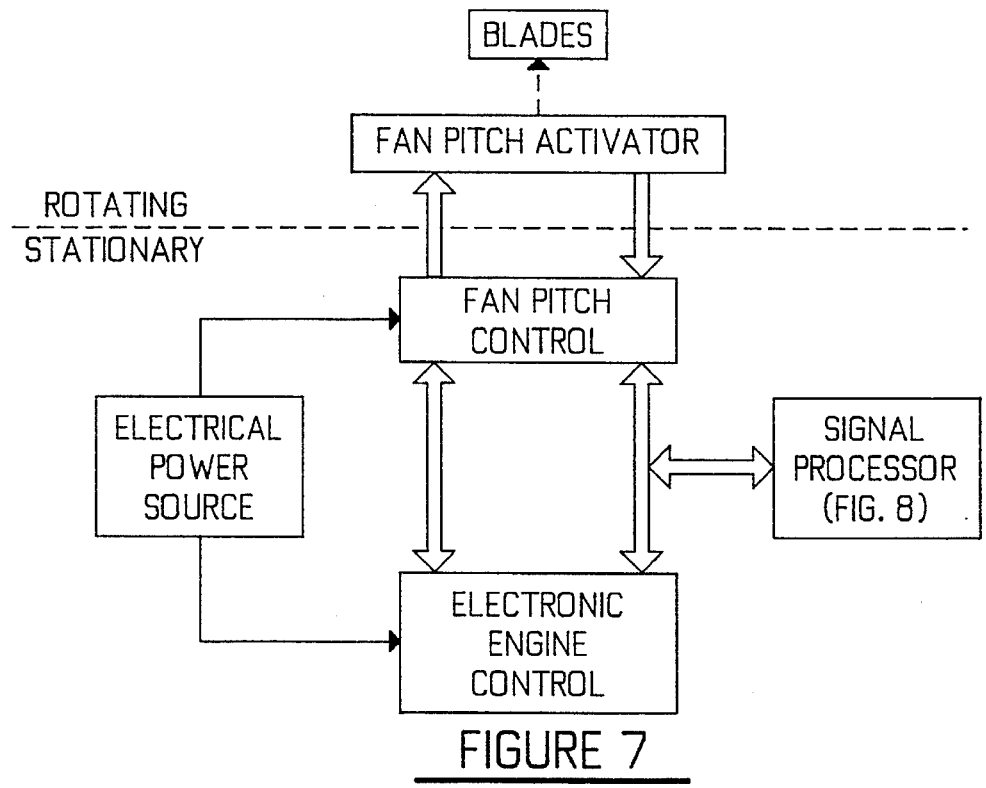
FIG. 7 shows an electronic engine control that may use the present invention.
Figure 8:
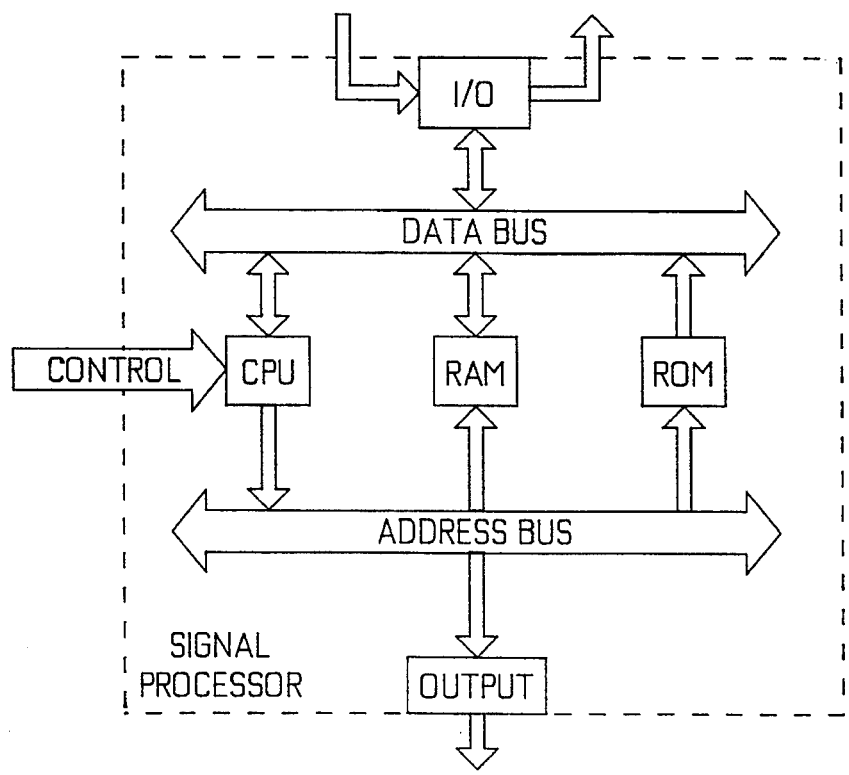
FIG. 8 shows a signal processor that may be used to carry out the present invention using the program of FIGS. 9(a)–(d).
Figure 9A:
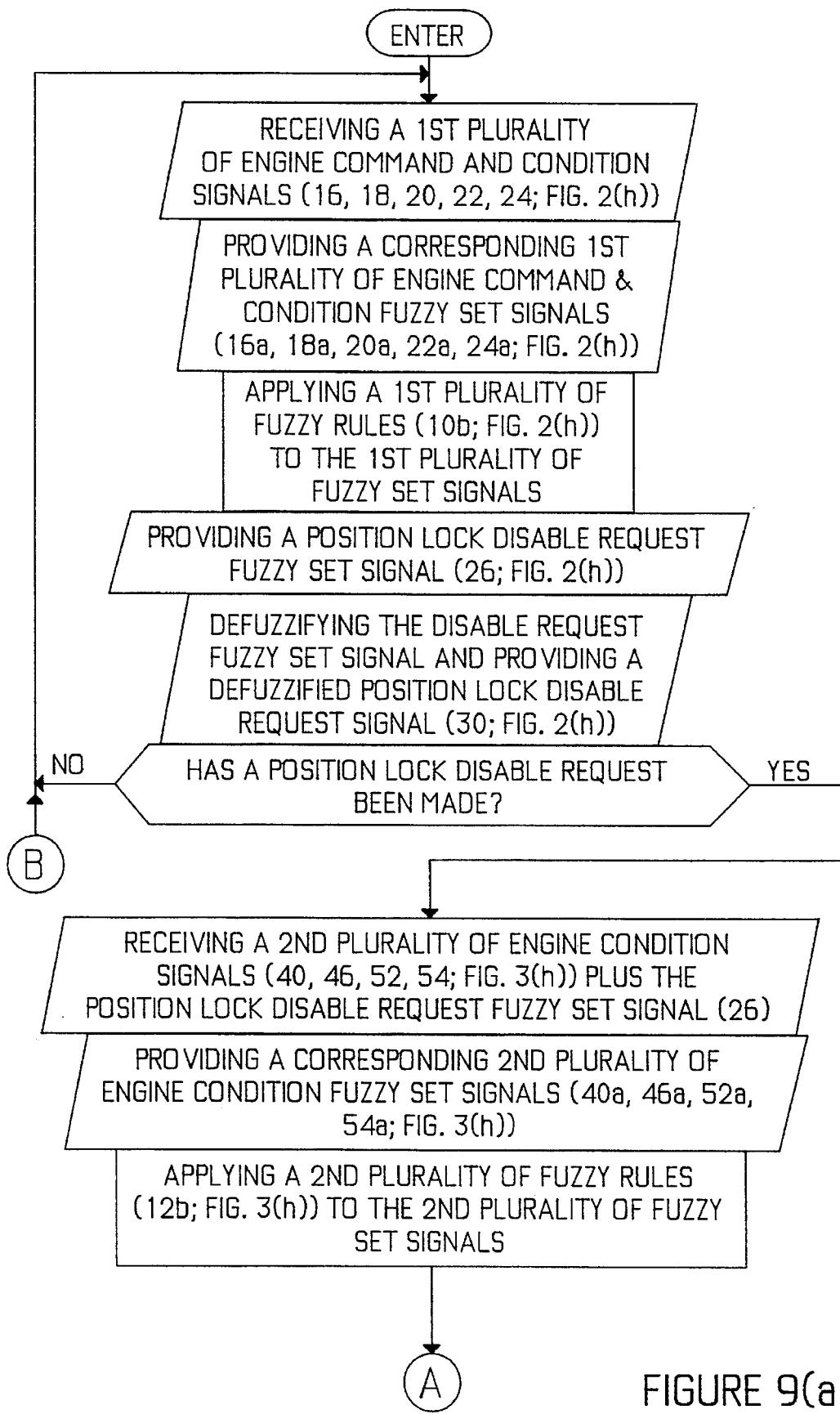
Figure 9B:
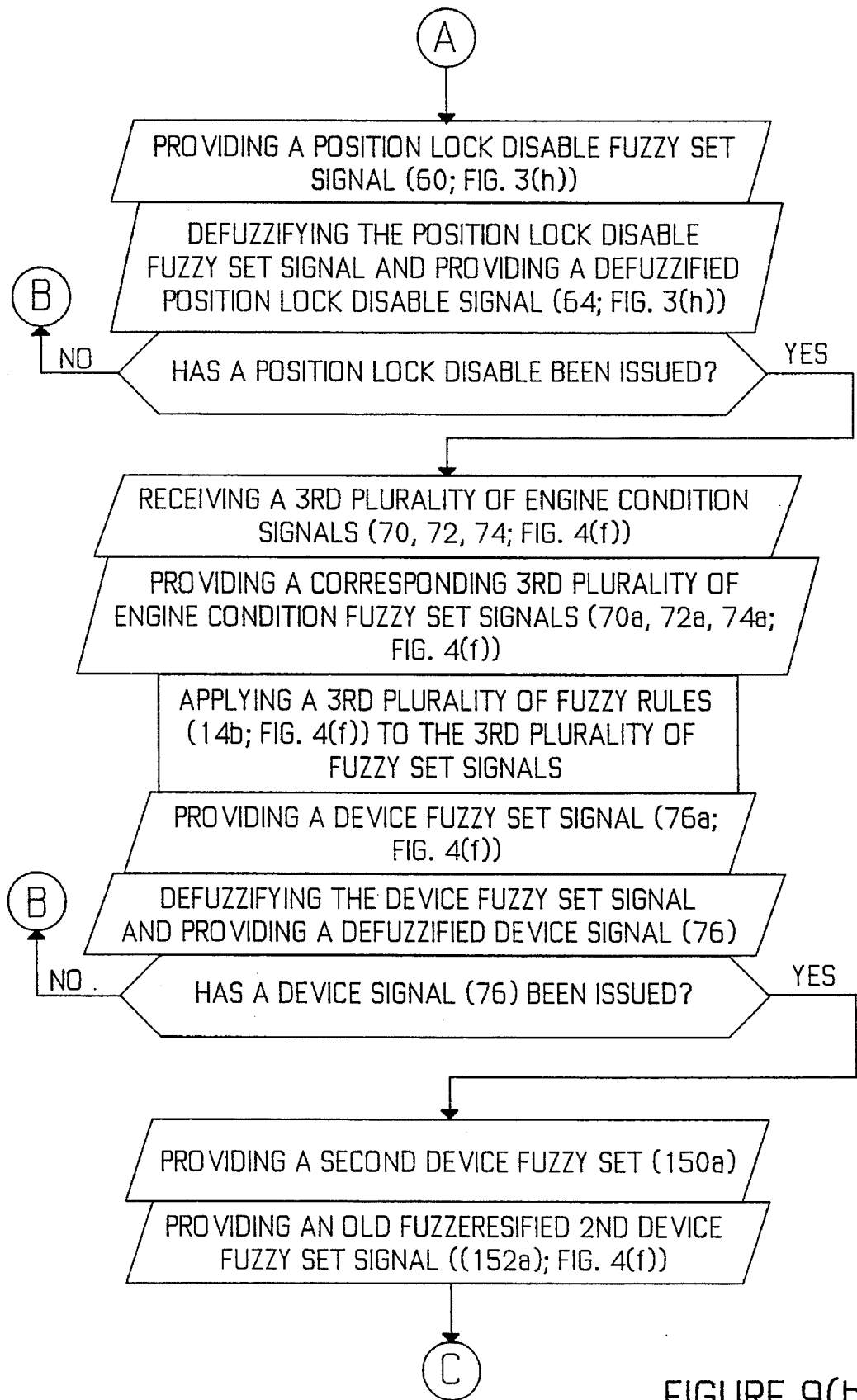
Figure 9D:
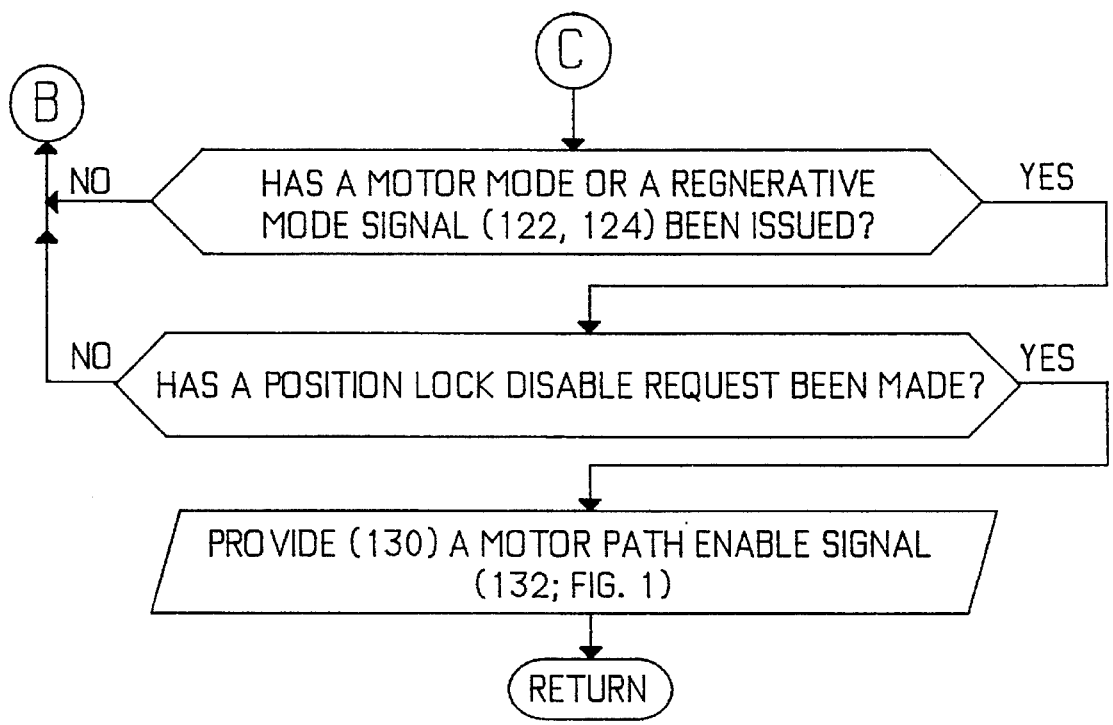

It will, of course, be understood that the blocks shown in FIG. 1 are system level blocks that are useful in explaining the overall function of the system, but that would actually be carried out in a control system such as a microprocessor-controlled digital electronic engine control shown in FIG. 7. In that case, the various input signals shown in FIG. 1 will be provided to an input/output port of a signal processor that will include a central processing unit, a random access memory, a read-only memory for storing programs, and various data control and address buses. The signal processor of FIG. 7 will carry out the system level functions desired in FIG. 1 using a program stored in the read-only memory thereof. The program may execute steps such as shown in FIG. 8, for example. The outputs of the control will be provided to the actuator described above to control the various windings of the motors to control the pitch of the blades.

The fuzzy logic block 10 of FIG. 1 is responsive to a position lock status signal on a line 16, a delta-beta command signal on a line 18, a differential rotor speed signal on a line 20, a delayed time unlocked signal on a line 22 and a beta error signal on a line 24. "Beta" is a term known in the art of controllable pitch propeller blades and refers to the angle of the blade. The fuzzy logic block 10 is shown providing an output signal on a line 26 which is a signal having a membership that is indicative of the level of belief as to whether a position lock disable request should be issued or not. This fuzzy output is defuzzified in a block 28, to be described in detail below, in order to provide a "crisp" position lock disable request signal on a line 30 to the torque balance indication fuzzy logic block 12.

A position lock disable request signal will be issued on a line 30 depending on a fuzzy rule set resident in the block 10. A beta command signal on a line 32 initiates the whole process by requesting a change in blade pitch, i.e., from one of the discrete positions to another of the discrete positions and all positions in between. A delay block 34 delays the beta command signal on the line 32 for a selected time and provides a delayed beta command signal on a line 36 to a subtractor 38 which takes the difference between the beta command signal on the line 32 and the delayed beta command signal on the line 36 for providing a delta-beta signal on a line 40. This is provided to the torque balance indication fuzzy logic block 12, to be described later, and to an absolute value block 42 which takes the absolute value of the signal on the line 40 and provides it on the line 18 to the position lock disable request fuzzy logic block 10, as described previously. The purpose of delaying the beta command and comparing it to itself and providing a delta-beta command is to determine how quickly the commanded beta is being changed.

The delta-beta signal on the line 40 is fuzzified in the fuzzy logic block 12 as shown in FIG. 3(c) in order to be characterized as either negative, positive or somewhere in between. In other words, given some arbitrary delay in the delay block 34, and a delta-beta command, as shown in FIG. 3(c) of −0.1, this would be fuzzified in a fuzzy set with basis elements negative and positive as being an entirely negative delta-beta. The fuzzy set would include a 1.0 negative member and a zero positive member. If, on the other hand, the delta-beta command were −0.02, the fuzzy set would include a negative basis element with an approximately 0.75 membership or "belief" in class and an approximate 0.25 positive basis element membership of belief in class. Similarly, for the fuzzification of the absolute value version of the same signal on the line 18, FIG. 2(b) shows small, medium and large basis elements for differing levels of membership of "belief" in class, depending on the crisp value of the delta-beta command on the line 18. For example, for a 0.075 delta-beta command level on the line 18, the small and large basis elements would be a zero levels, while the medium basis element would be maximized at about 100 percent belief. Between 0 and 0.05 delta-beta command, on the other hand, both the small and medium basis elements will come into play in the fuzzy set, as illustrated in FIG. 2(c), with varying degrees of membership depending on exactly what level the delta-beta command is at within the range 0–0.05. A similar statement could be made for the range 0.1–0.2 with both medium and large basis elements playing a part. It will be observed that the same basic delta-beta command signal has been subjected to different fuzzification processes for the two different fuzzy logic blocks 10, 12. It should be realized, of course, that these fuzzy set descriptions are illustrative only and are certainly subject to modification. In some cases, it is conceivable that some fuzzy sets could be omitted without undue detrimental effect, and perhaps even improvement in some circumstances. When considering the broadest statement of the invention, it is also important to understand that it is the hierarchical fuzzy logic system that is disclosed herein that is the basic building block of which various fuzzy logic sets and even blocks can be moved in and out while still remaining within the spirit of the invention.

The reasons for characterizing the delta-beta command in fuzzy sets such as shown in FIGS. 2(c) and 3(c) will become apparent when considering the exemplary fuzzy rules of FIGS. 2(a) and 3(a), respectively.

The position lock disable request fuzzy logic block 10 is also responsive to the position lock status signal on the line 16, which may be fuzzified as shown in FIG. 2(b). The position lock status signal on the line 16 varies between 0 and 1 and is provided by an inverter 44 that is responsive to a delayed signal on a line 46 from a delay circuit 48 that is in turn responsive to the position lock disable request signal on the line 30.

The inverter 44 translates a signal request to disable (enable) the position lock to an indication of whether the position lock is about to be unlocked (locked). This information is utilized in the fuzzy ruleset (FIG. 2(a)) to determine the next action.

Referring now to FIG. 2(a), an example is shown of how the input signals on the lines 16 and 18 that are fuzzified according to the quantitative illustrations of FIGS. 2(b)–(f) are utilized in a qualitative fuzzy rule set within the fuzzy logic block 10. The fuzzy rules of FIG. 2(a) are illustrated in FIG. 2(h) in a block 10b. There, the position lock disable request fuzzy logic block 10 of FIG. 1 is illustrated in more detail, as comprising a fuzzifying block 10(a) and a fuzzy rules block 10b. In response to the input signals 16, 18, 20, 22, 24 of FIG. 1, the position lock disable request fuzzy logic block 10 of FIG. 2(h) fuzzifies each individual input signal into a corresponding fuzzy set, as illustrated quantitatively in FIGS. 2(b)–(f). Each of these fuzzy sets is represented by a corresponding fuzzy set signal 16a, 18a, 20a, 22a, 24a being input to the fuzzy rule block 10b, which contains fuzzy rules such as shown in FIG. 2(a), except being implemented in a quantitative fashion. The fuzzy rules block 10b is illustrated as outputting the position lock disable request fuzzy set of line 26 of FIG. 1, which is in turn provided to a defuzzification block 28, also illustrated in FIG. 1 having a fuzzy rule where a position lock disable request greater than 0.5 will result in a crisp position lock disable request on the line 30 being "on". Anything less than 0.5 will result in the crisp output signal indicating a position lock disable request of "off" on the line 30.

The specific rules of the position lock disable request logic of FIG. 2(a) will now be described.

Figure 2G:
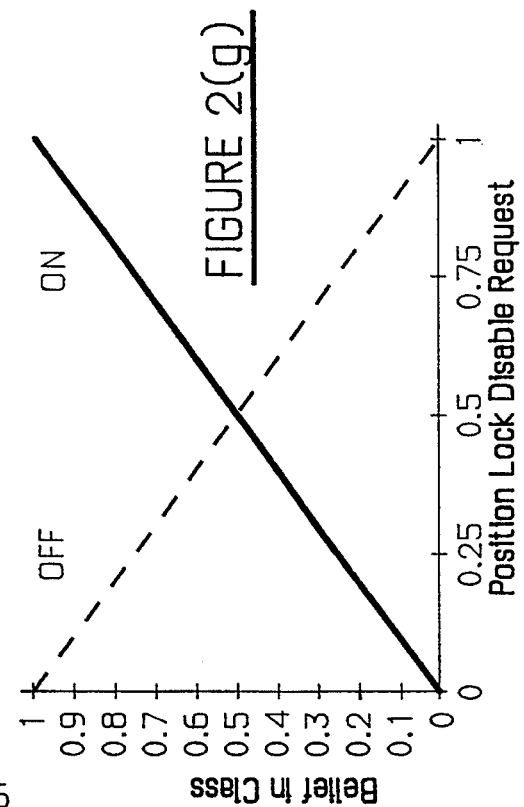
FIG. 2(g) shows a fuzzy set for fuzzifying the position lock disable request signal.

Referring to Rule 1 of FIG. 2(a), if the position lock status signal on the line 16 indicates "locked", meaning that the position lock status signal on the line 16 is greater than 0.5, and the delta-beta command on the line 18 is small, i.e., less than about 0.04, then the output of the fuzzy logic block 10 on the line 30 will be a position lock disable request that is "off". In other words, the position lock disable request signal on the line 26 will be less than 0.5, as shown in FIG. 2(g). This means that since the delta-beta command is not changing very much and the position lock status is already locked, it will be left that way, and nothing further will be caused to happen.

Although the above-described Rule 1 for position lock disable request logic block 10 has been described qualitatively, it will be understood that fuzzy rules described in such a qualitative way can be carried out using various fuzzy rule implementation methods, known in the art, such as Larsen implication and Mean of Max (MOM) defuzzification. Other methods such as Mandami implication and Centroid or Center of Area defuzzification may also be used.

The particular methods employed in the implementation of this system has been to use the MAX-MIN method in evaluating logical connectives OR-AND, the Mandami method of evaluating the implication in each rule and the Mean of Max method for defuzzification. Each rule is evaluated separately and the results are aggregated (into a final result) by means of a weighted average (the weights being the belief associated with each rule that is fired)

On the other hand, FIG. 2(a) shows in Rule 2 that if the position lock status is locked and the delta-beta command is not small, then the position lock disable request should be turned "on". Similarly for Rule 3, where status is unlocked, and the delta-beta command is not small, in that case also, the position lock disable request is turned "on" or left "on".

Figure 2F:
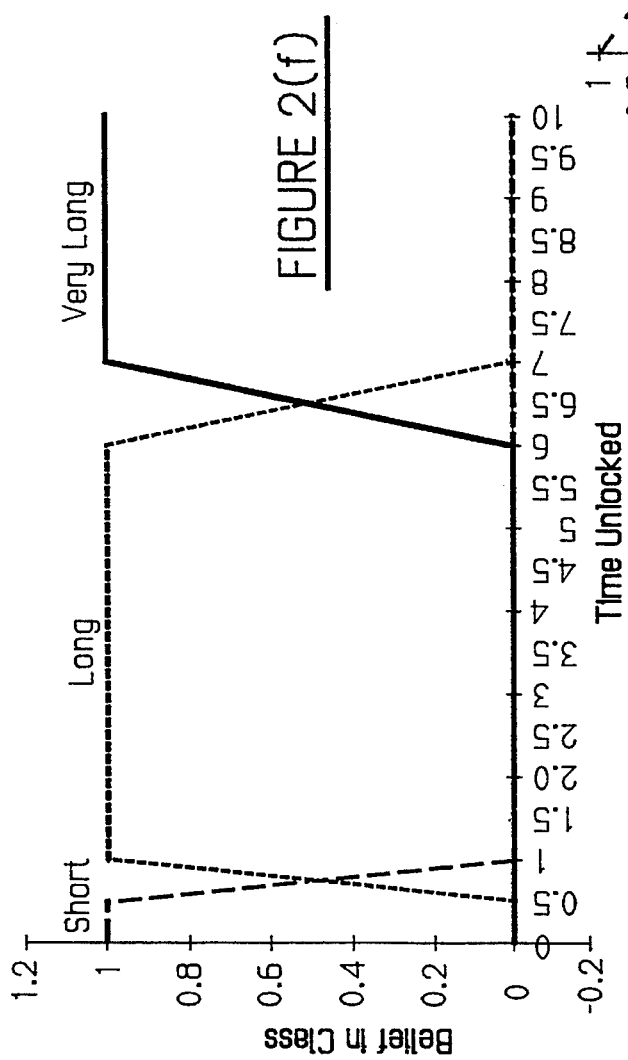
FIG. 2(f) shows a fuzzy set for fuzzifying the time unlocked signal.
Figure 2H:
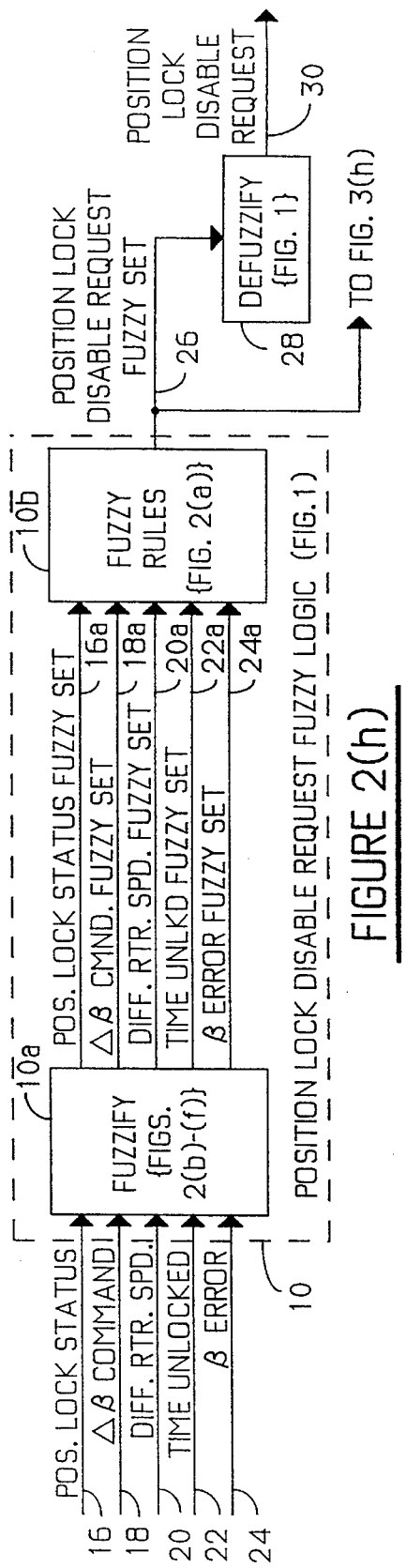
FIG. 2(h) shows the relation between the fuzzification of the input signals and the application of fuzzy rules thereto in more detail.

Referring back to FIG. 1, it is seen that the fuzzy logic block 10 is also responsive to the differential rotor speed signal on the line 20, which may be fuzzified, as shown in FIG. 2(d) into a differential rotor speed fuzzy set as shown on the line 20a of FIG. 2(h). In that case, the differential rotor speed is considered to be maximally small around zero and increasingly large in both the positive and negative directions of increasing rotor speed. Similarly, the time unlocked signal on the line 22 can be fuzzified as shown in FIG. 2(f) as being a fuzzy set on the line 22a of FIG. 2(h) with basis elements short, long and very long, with varying degrees of membership depending on the magnitude of the time unlocked signal. When taking differential rotor speed and "time unlocked" into consideration in fuzzy Rule 4 of FIG. 2(a), it is seen that if the position lock status is unlocked, the delta-beta command is small, the differential rotor speed is small, and the time unlocked is long, then the position lock disable request should be "off". This indicates that the pitch command transient has ceased and that rotor speed approximately matches fan speed and hence the position lock should be enabled (i.e., disable is off). Since time unlocked is considered long, implying that the motor and/or brake have been deployed for that period of time, the lock should be enabled to avoid over-stressing these devices.

In Rule 5 of FIG. 2(a), an unlocked position lock status and a short time unlocked indication will result in a position lock disable request of "on". This is to allow the position lock to remain unlocked at the initiation of a pitch change (where differential rotor speed and delta beta command are probably small).

In Rule 6 of FIG. 2(a), a position lock status of unlocked, a delta-beta command that is small and a differential rotor speed that is not small will result in a position lock disable request being "on". The position lock disable request is turned on in this circumstance because enabling the position lock when the rotor speed does not match the fan speed could risk damage to the locking mechanism.

Referring back to FIG. 1, the fuzzy logic block 10 is also responsive to the beta error signal on the line 24 being an indication of the difference between the beta command signal on the line 32 and an actual sensed beta value which may be provided by a sensor (not shown). This may be fuzzified into the fuzzy set on the line 24a of FIG. 2(h), as shown in FIG. 2(e) in a manner similar to the differential rotor speed signal, i.e., that is maximally small about 0 and decreasingly small within increasing beta error in both the positive and negative directions. In FIGS. 2(d) and 2(e), the fuzzy sets each include only one basis element.

In fuzzy Rule 7 of FIG. 2(a), for a position unlocked status and a beta error that is not small, the output of the position lock disable request fuzzy logic block 10 will be "on". This provides a means to unlock when sensed position and commanded position differences become significant.

Whereas, for Rule 8, if the position lock is unlocked and a significant amount of time has passed, then the lock should remain unlocked if sensed position is not close to commanded position.

Rule 9 says to shut off the position lock disable request if the position lock status is unlocked and the time unlocked has been very long. This is because remaining active for an overly extended period of time may result in permanent damage to the induction motor and/or brake, as a result of exceeding the thermal duty cycle design limits of the machines.

It will now be understood that the position lock disable request fuzzy logic block 10 in conjunction with the defuzzifier block 28 of FIG. 1 will provide a position lock disable request signal on the line 30 according to the rules shown in FIG. 2(a) with input parameters fuzzified according to FIGS. 2(b)–(f). It will also be understood, as suggested above, that the various fuzzification algorithms shown in FIGS. 2(b)–(f) for the input parameters can be altered, omitted, added to, and the like in order to provide a selected set of fuzzy sets for use by a correspondingly-selected set of rules for determining whether or not a position lock disable request should be issued. Thus, the first step of the hierarchical fuzzy logic system of the present invention for commanding the engagement and disengagement of the motor/brake rotor assembly locking mechanism has been shown. In other words, that part of the system that initiates a request for disengagement and subsequent re-engagement of the rotor lock on the basis of various input measurements has been shown.

As also shown in FIG. 1, the position lock disable request is monitored by another fuzzy logic block 12, which determines the appropriate time to disengage (or engage) based upon this request and provides an estimate of when a torque balance between the aerodynamic and centrifugal forces acting on the fan blade are sufficiently countered by the developing torque of the activated inductive machine. It should be realized that although FIG. 1 shows the fuzzy logic block 12 being responsive to a fuzzy position lock disable request signal on the line 26, it could also be responsive to the crisp position lock disable request signal on the line 30. The only reason that the signal on the line 26 has been shown as being provided to the fuzzy logic block 12 directly is that the fuzzy logic block 12, for the exemplary embodiment, would simply re-fuzzify the crisp position lock disable request signal on the line 30 into the equivalent of the fuzzy set on the line 26. These are, of course, equivalent, and either approach may be taken. The logic of block 12 is also based upon various input parameters which will be described below and which may be fuzzified according to any selected method, such as shown in detail below. Also shown are additional fuzzy rules that decide whether or not to lock the blade based on the fuzzified input parameters.

In addition to the delta-beta signal on the line 40 and the position lock disable request signal on the line 30, the fuzzy logic block 12 is also responsive to the time unlocked signal on a line 49 provided by an integrator 50 and which is representative of the time unlocked. It is different from the time unlocked signal on the line 22, in that it has not been delayed. It is also fuzzified differently, as shown in FIG. 3(d) (compared to FIG. 2(f)). The fuzzy logic block 12 is also responsive to a torque available signal on a line 52 and a torque required signal on a line 54, both from a classical torque available estimation block 56 that is responsive to a plurality of signals including an estimated brake torque signal on a line 58, an estimated motor torque signal on a line 60, a differential ball screw position signal on a line 62, a fan speed signal on a line 64 and a beta zero signal on a line 66. The torque available estimation block 56 performs the function of estimating torque available from the motor (or brake, whichever is active) for the purpose of driving the pitch mechanism. The torque required signal indicates the amount of opposing (or aiding) forces acting against (or with) those being produced by the induction devices and is derived by conventional means.

The torque available from any induction machine may be derived from the steady state equivalent circuit model of a polyphase induction machine, developed by Charles Steinmetz. This per phase circuit model incorporates the essential characteristics of a given induction machine, namely $r_1$—stator resistance, $x_1$—stator reactance, $x_m$—magnetizing (field) reactance, $r_2$—rotor resistance (reflected to the stator) and $x_2$—rotor reactance (reflected to the stator). From this model, it can be shown that at any speed, torque is proportional to the square of supply voltage. The available torque is represented mathematically by the equation $$T_{avail} \cong \frac{KV^2_{supply}(r_2/s)}{\omega_s[r_1 + (r_2/s)]^2 + [x_1 + x_2]^2}$$

where 107=synchronous electrical frequency, s=per unit slip frequency, and K=proportionality constant.

A thorough discussion of an induction machine per phase equivalent circuit model can be found in McPherson, George, *An Introduction to Electrical Machines and Transformers,* John Wiley & sons, New York, 1981.

The torque required of the induction machines at the rotor/ballscrew interface is a function of the estimated centrifugal and aerodynamic twisting moments at each fan blade. The twisting moment at each blade is a function of fan speed and pitch angle. This torque may be reflected back to the rotor by accounting for 1) the number of blades, 2) the total coupling (gear ratio) between the motor/brake rotor and blades, and 3) any inefficiency in the fan pitch change gear train. This required torque is represented mathematically by the equation $$T_{required} = \left(\frac{\eta}{CR}\right) * \left[ CTM_{Net} * \cos(2(\beta_{sensed} - \beta_{Max})) * \left(\frac{FanSpeed}{MaxSpeed}\right)^2 + AeroLoads \right]$$

where CR=coupling ratio between rotors and blades; $CTM_{Net}$=net centrifugal twisting moment per blade; $\beta_{Max}$= beta angle at which maximum torque load occurs; Aero Loads= net aerodynamic load per blade.

Figure 3H:
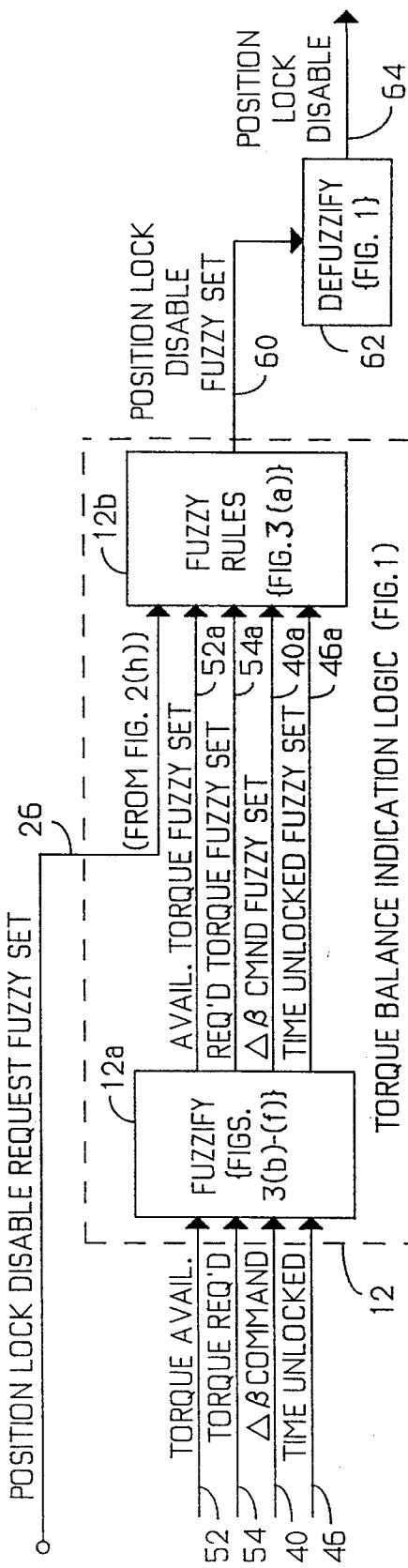
FIG. 3(h) shows the relation between the fuzzification of the input signals and the application of fuzzy rules thereto in more detail.
Figure 3D:
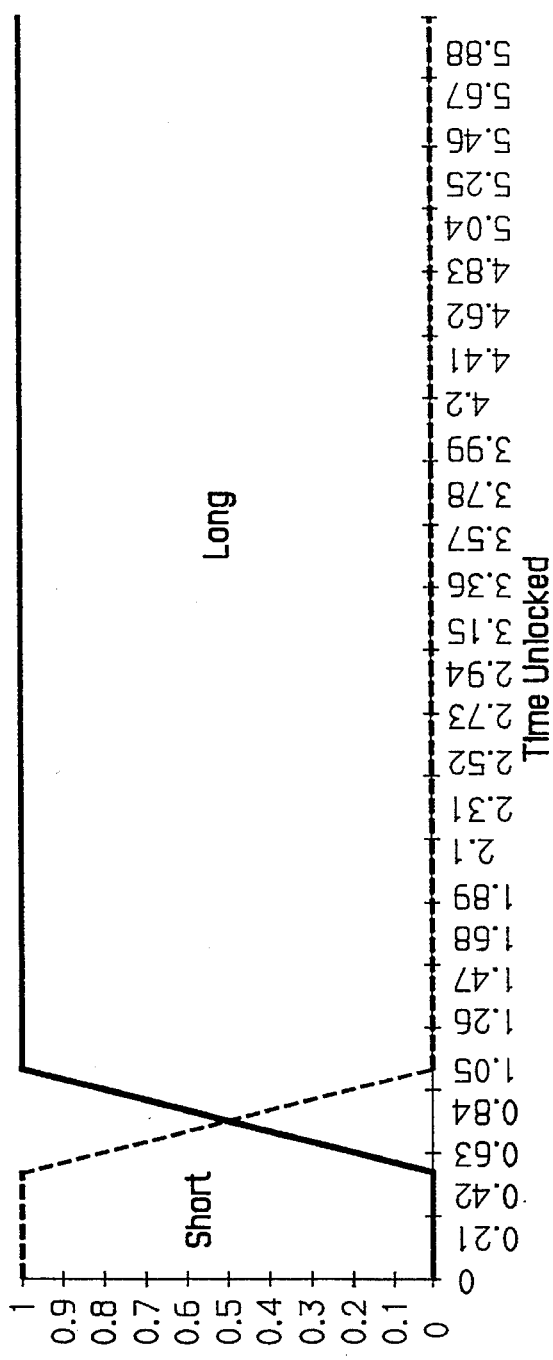
FIG. 3(d) shows a fuzzy set for fuzzifying a time unlocked input signal.
Figure 3G:
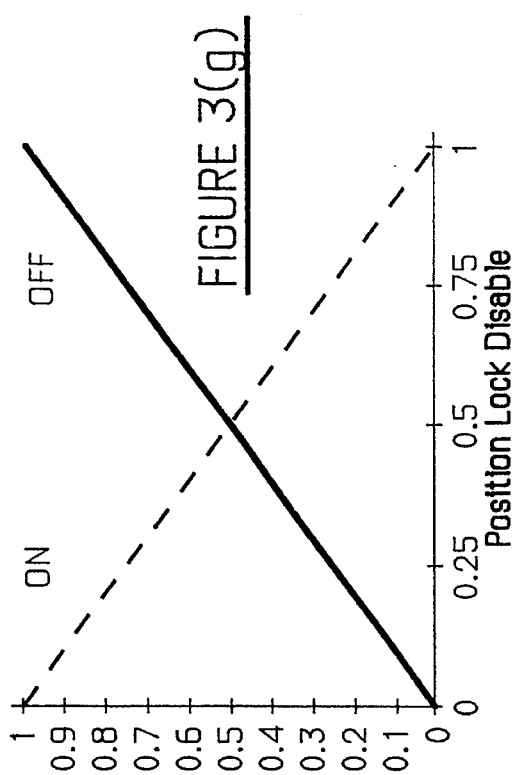
FIG. 3(g) shows a fuzzy set for fuzzifying a position lock disable signal.
Figure 3E:
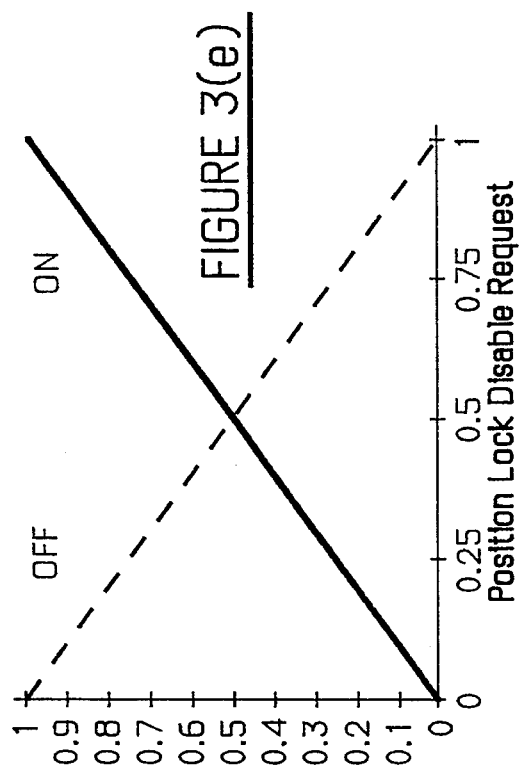
FIG. 3(e) shows a fuzzy set for fuzzifying a position lock disable request signal.
Figure 3F:
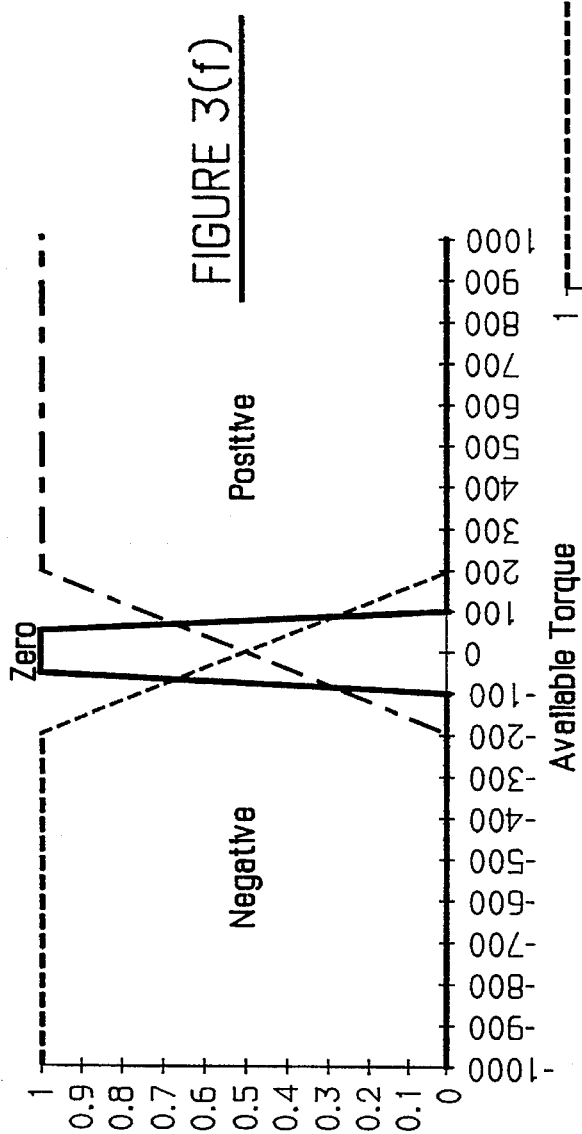
FIG. 3(f) shows a fuzzy set for fuzzifying an available torque signal.

The torque required signal on the line 54 is fuzzified as shown in FIG. 3(b) as having three basis elements characterized as negative, positive and zero, having various degrees of membership or "belief in class", depending on the magnitude of the required torque signal on the line 54. These were selected, as shown, to be pretty much an either-or situation, i.e., either negative, zero or positive, with very little overlap. The fuzzification process is further illustrated by a block 12a in FIG. 3(h) providing a fuzzy set signal 54a that contains the members of the fuzzy set and which are provided to a fuzzy rule set 12b. Similarly, the available torque signal on the line 52 may be fuzzified as shown in FIGS. 3(f) and 3(h) in a similar manner. The delta-beta command signal on the line 40 is fuzzified differently than was done for the absolute value thereof, which was described previously in connection with FIG. 2(c), in that in FIG. 3(c), there are only two basis elements, i.e., negative and positive, with some overlap in the small region −0.04–0.04, as may selected by design choice.

The position lock disable request fuzzy set signal on the line 26 is shown in FIGS. 1 and 3(h) as being an input to the fuzzy logic block 12.

Referring now to FIG. 3(a), various fuzzy rules for evaluating the input signals fuzzified as shown in FIGS. 3(b)–(f) are shown. The eight rules in the ruleset of FIG. 3(a) are divided into three sets: the first containing three rules (Rules 1, 2, 3) pertaining to decreasing pitch (delta-beta negative); the second containing three rules (Rules 4, 5, 6) pertaining to increasing pitch (delta-beta positive) and the third set containing two rules (Rules 7, 8) which are irrespective of pitch. Rules 1–6 all operate with the position lock disable request signal set to ON, while Rule 8 assumes the request signal at OFF.

In Rule 1, pitch commanded is decreasing (delta-beta negative) and required torque is positive and available torque is zero, indicating an approximate balanced torque between the load (which is opposing pitch movement in this case) and the torque produced by the motor (or brake). Since the disable request signal is ON, the result of this rule is to grant the request and set position lock to OFF (i.e., unlock), since a torque balance has been achieved.

In Rule 2, pitch commanded is decreasing (delta beta negative) and available torque is positive, indicating an excess of available torque to move in the decreasing pitch direction. Since the disable request signal is ON, the result of this rule is to grant the request and set position lock to OFF (i.e., unlock), since a torque being produced by the motor or brake is sufficient to overcome any opposing load. Since required torque is not specified in this rule, it also covers the scenario where there exists an aiding load (i.e., a load torque which contributes to the direction of desired motion).

In Rule 3, pitch commanded is decreasing (delta beta negative) and available torque is zero and required torque is zero, indicating a no-load situation. Since the disable request signal is ON, the result of this rule is to grant the request and set position lock to OFF (i.e., unlock), since there does not exist any load to retard or misdirect the pitch movement and hence the position lock may be released before the motor is powered.

Rules 4, 5 and 6 are essentially the pitch commanded increasing equivalents of Rules 1, 2 and 3 respectively. In Rule 3, pitch commanded is increasing (delta beta positive) and required torque is negative and available torque is zero, indicating an approximate balanced torque between the load (which is opposing pitch movement in this case) and the torque produced by the motor (or brake). Since the disable request signal is ON, the result of this rule is to grant the request and set position lock to OFF (i.e., unlock), since a torque balance has been achieved.

In Rule 4, pitch commanded is increasing (delta beta positive) and required torque is negative and available torque is zero, indicating an approximate balanced torque between the load (which is opposing pitch movement in this case) and the torque produced by the motor (or brake). Since the disable request signal is ON, the result of this rule is to grant the request and set position lock to OFF (i.e., unlock), since a torque balance has been achieved.

In Rule 5, pitch commanded is increasing (delta beta positive) and available torque is negative, indicating an excess of available torque to move in the increasing pitch direction. Since the disable request signal is ON, the result of this rule is to grant the request and set position lock to OFF (i.e., unlock), since a torque being produced by the motor or brake is sufficient to overcome any opposing load. Since required torque is not specified in this rule, it also covers the scenario where there exists an aiding load (i.e., a load torque which contributes to the direction of desired motion).

In Rule 6, pitch commanded is increasing (delta beta positive) and available torque is zero and required torque is zero, indicating a no-load situation. Since the disable request signal is ON, the result of this rule is to grant the request and set position lock to OFF (i.e., unlock), since there does not exist any load to retard or misdirect the pitch movement and hence the position lock may be released before the motor or brake is powered.

In Rule 7, the disable request signal is ON and unlock time is long, resulting in a granting of the request and the position lock is set to OFF (i.e., unlock). This is a general safeguard rule which basically stipulates that if a request to unlock is made and the system is unable to resolve the torque balance issues (covered by the preceding six rules), then the request should be granted after sufficient time has passed.

In Rule 8, the disable request signal is OFF and is unequivocally granted by setting position lock to ON.

The rotor position lock disable logic of fuzzy logic blocks 10 and 12 have now been explained. It will be recalled that the fuzzy logic block 10 first initiates a request for disengagement and subsequent re-engagement of the rotor lock on the basis of five input measurements: current position lock status, commanded blade angle change, differential rotor speed, blade angle error and time. The rules governing this function were shown in FIG. 2(a). The generated position lock disable request output from this block is monitored by the block 12 of FIG. 1, which is another fuzzy logic system which determines the appropriate time to disengage (or engage) based upon this request and provides an estimate of when a torque balance between the aerodynamic and centrifugal forces acting on the fan blade are sufficiently countered by the developing torque of the activated inductive machine. This logic is also based upon five variables and a rule base appearing in FIG. 3(a). The input labeled "torque required" was determined by a classical torque estimation method outside of this invention and shown generally by the block 56. The motor/brake selection logic of block 14 will now be described in its proper place in the hierarchical fuzzy logic system of the present invention.

Figure 4B:
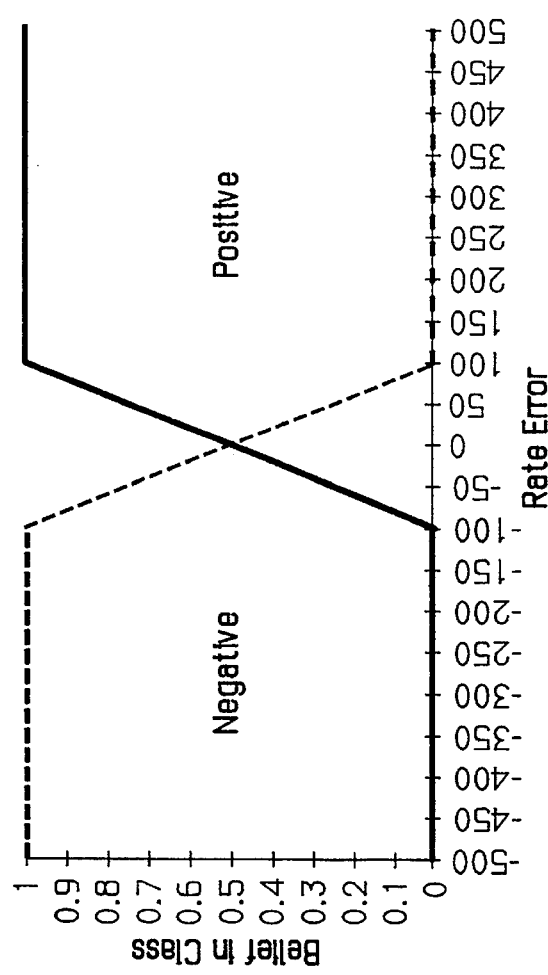
FIG. 4(b) shows a fuzzy set for fuzzifying a rate error signal.
Figure 4E:
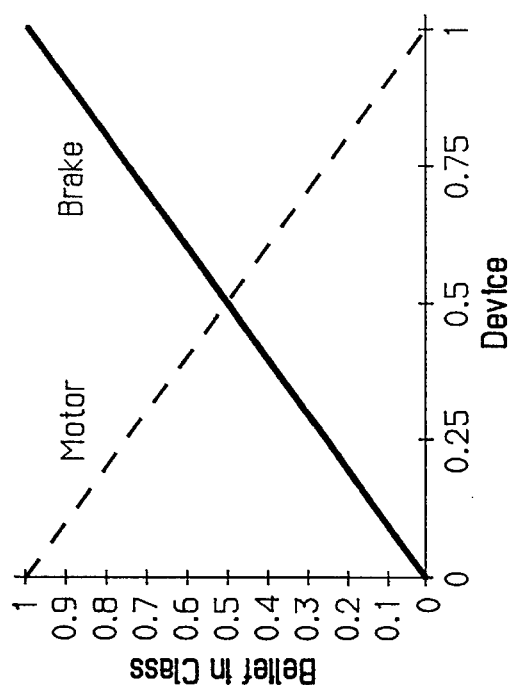
FIG. 4(e) shows a fuzzy set for fuzzifying a device signal.
Figure 4C:
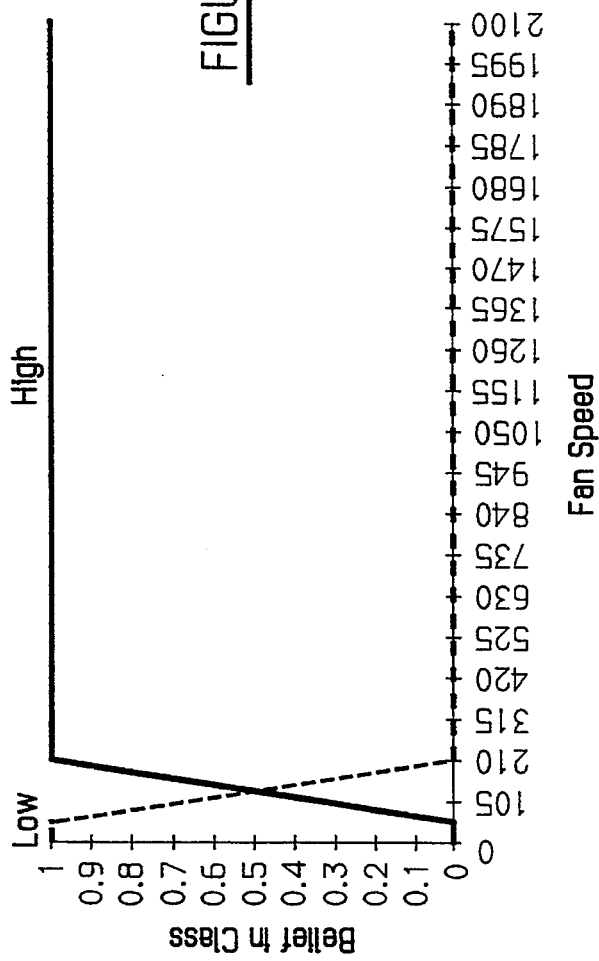
FIG. 4(c) shows a fuzzy set for fuzzifying a fan speed signal.
Figure 4D:
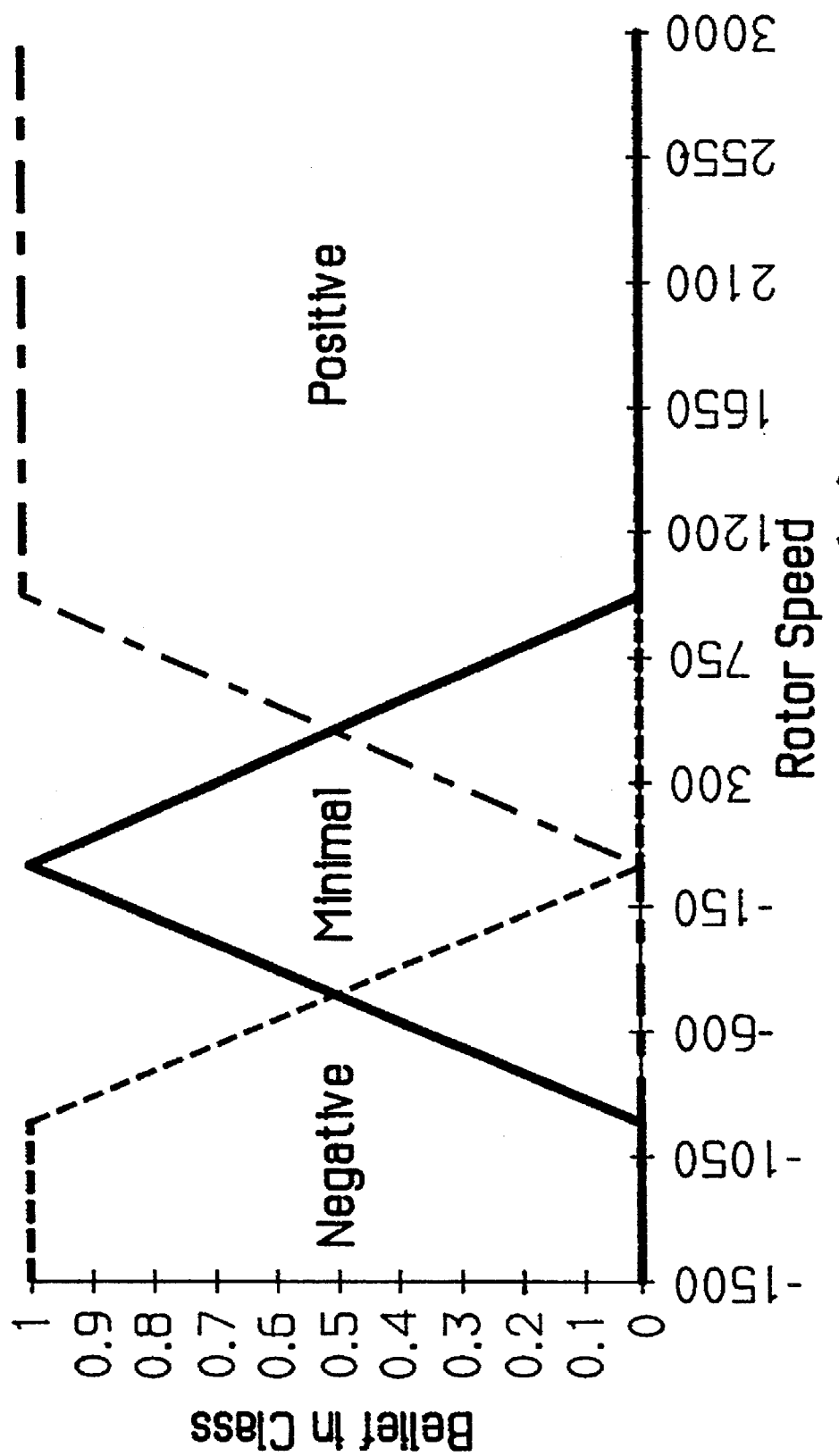
FIG. 4(d) shows a fuzzy set for fuzzifying a rotor speed signal.
Figure 4F:
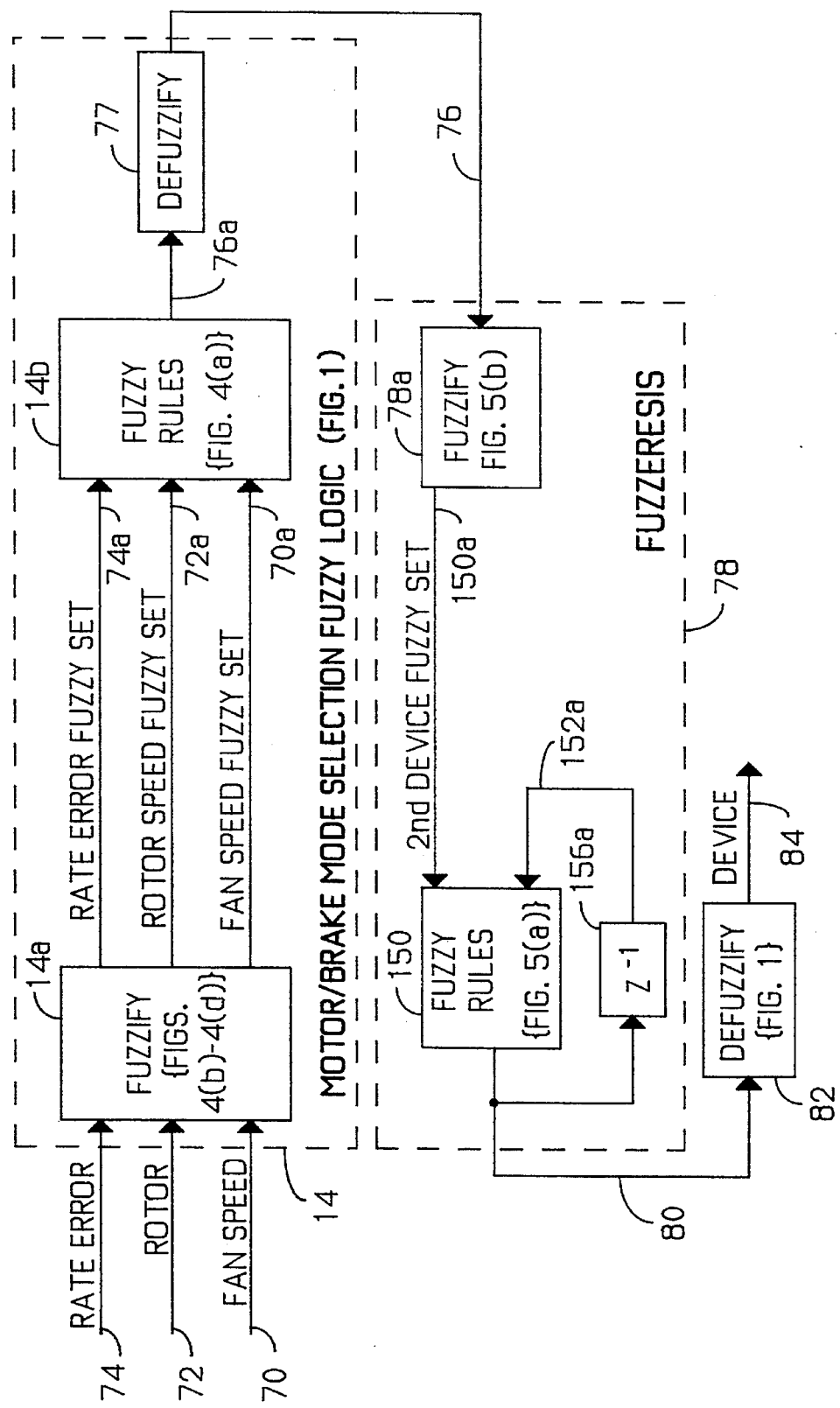
FIG. 4(f) shows the relation between fuzzification of the input signals and application of fuzzy rules thereto in more detail, as well as showing application of the fuzzeresis process of FIG. 1.

Referring now to the motor/brake mode selection fuzzy logic block 14 of FIG. 1, such is responsive to a fan speed signal on a line 70, a rotor speed signal on a line 72 and a rate error signal on a line 74. The fan speed signal is representative of fan rotor rpm. The rotor speed signal is representative of motor/brake rotor rpm. The rate error signal on the line 74 is indicative of the difference between commanded and actual differential rotor rpm. These three "crisp" input signals may be fuzzified as shown in FIGS. 4(b)–4(d) and as further illustrated by a block 14a of FIG. 4(f). A set of fuzzy logic rules such as shown in FIG. 4(a) may be carried out in the fuzzy logic block 14 of FIG. 1 (as shown in a block 14b of FIG. 4(f)) operating on the fuzzified input parameters 74a, 72a, 70a of FIGS. 4(b)–(d) and FIG. 4(f). A device fuzzy set signal on a line 76a is indicative of the degree of membership or "belief in class", as shown in FIG. 4(e) as to the degree of membership of the two basis elements "motor" and "brake". This is defuzzified in a block 77 of FIG. 4(f), for example by way of the Mean of Max method, into a "crisp" device signal on a line 76 indicative of motor or brake. A fuzzeresis block 78 next operates on the crisp signal on the line 76 in a manner to be described more fully below in connection with FIGS. 5(a)–5(c). A fuzzy output signal on a line 80 from the fuzzeresis block 78 is defuzzified in a block 82 for providing a "crisp" indication on a line 84 of either the brake or motor being selected by the fuzzy logic block 14 in combination with the fuzzeresis block 78, as defuzzified in block 82. It should be realized that the defuzzifying block 82 could as easily have been illustrated within the fuzzeresis block 78. Similarly, the fuzzifying block 78a could have been drawn outside the fuzzeresis block 78 of FIG. 4(f). Referring back to FIG. 1, the fuzzeresis block 78 along with the defuzzifying block 82 are shown with a "switch" 79 "wired" across their input on the line 76 and output on the line 84 to signify that the fuzzeresis process is optional.

Figure 6:
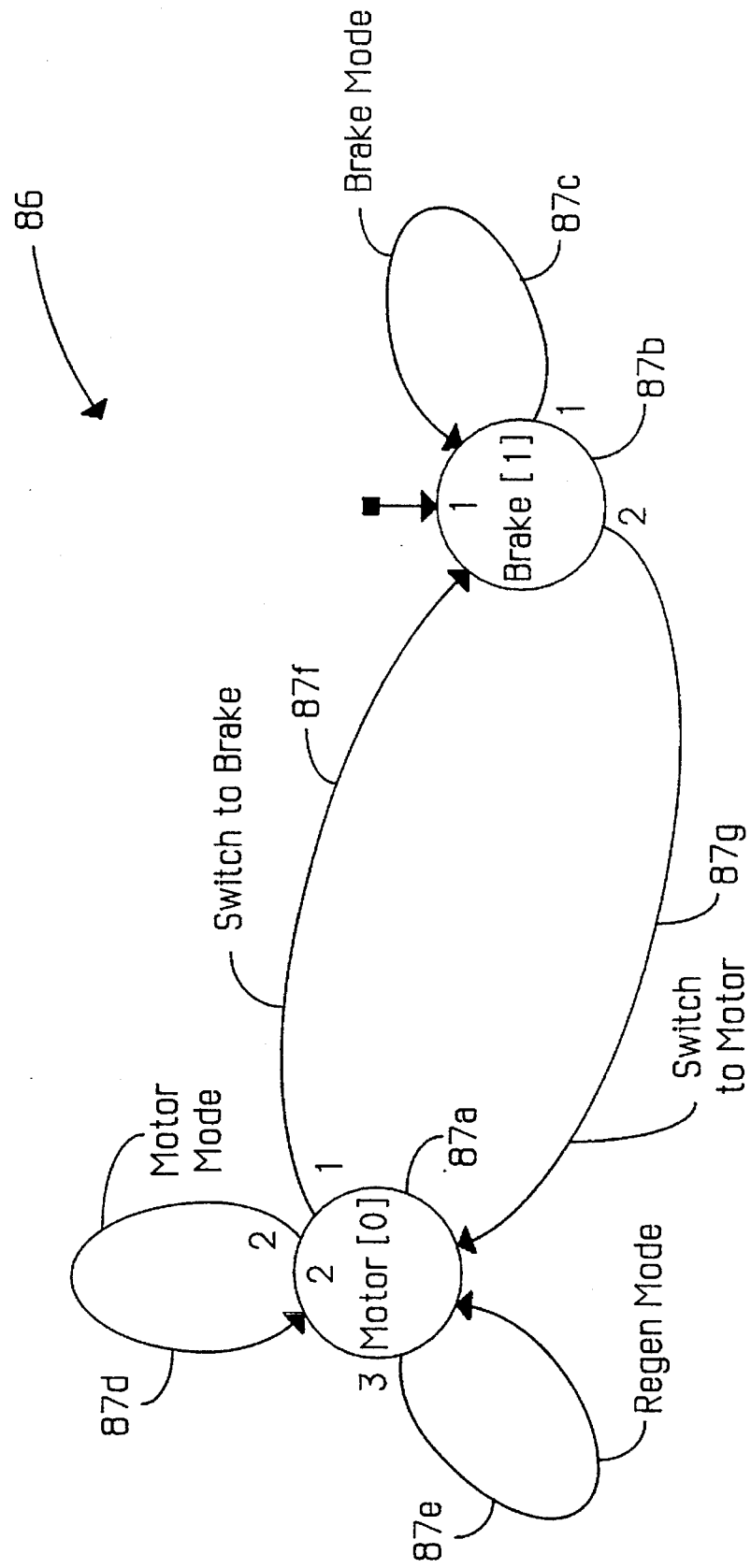
FIG. 6 shows the state machine of FIG. 1 in more detail.

The choice of device from block 82 is passed to a finite state machine 86, depicted in both FIGS. 1 and 6. The state machine 86 of FIG. 1 is shown having a motor/brake input on the line 84, a rotor speed signal on a line 88 and the rate error signal on the line 74. The state machine as shown in FIG. 6 records the choice between motor and brake as Moore states 87a, 87b and additionally provides Mealy state outputs (when in motor mode) to differentiate between motoring and regenerative operation.

The state machine is initialized in the BRAKE state 87b. The Moore state output from the state machine is either 0 or 1, with 0 indicating MOTOR mode and 1 indicating BRAKE mode. A loop 87c may be viewed as illustrating the providing of the brake mode signal on the line 120 of FIG. 1. When in MOTOR mode, the state machine determines whether or not the motor is acting as a regenerative device. This output is determined by a Mealy state output with the device said to be in regenerative mode when the following statement is FALSE: Rate error and rotor speed are both negative or both positive. If true, then the machine is in the motor mode.

This is illustrated by the loops 87d, 87e, which are indicative of the provision of the motor mode or regenerator mode signals on the lines 122, 124, respectively, of FIG. 1. Transitions between states 87a, 87b are indicated by transition lines 87f, 87g.

As shown in FIG. 1, the state machine 86 is responsive to both the "crisp" signal on the line 84 indicating whether motor or brake has been selected, a rotor speed signal on a line 88 and the rate error signal on the line 74 and provides, according to the state machine of FIG. 6, either a brake mode signal on a line 120 or a motor mode signal on a line 122 or 124, depending on whether the AC machine is being used in a motor or generator mode, i.e., as an absorber of electrical energy or as a generator thereof. An OR gate 126 provides an output signal on a line 128 if the signal on either line 122 or 124 is active, so as to indicate that the AC machine has been selected. If the position lock disable request signal on the line 30 is active and the signal on the line 128 is also active, then an AND gate 130 will provide a motor path enable signal on a line 132, which will then be used by the electronic engine control unit of FIG. 7 to control the motor to change the pitch according to the beta command on the line 132. Except to the extent that it must interface with the present invention, the known controls form no part of the present invention and are therefore not shown in any great detail. However, in general, the beta command may be compared to an actual beta, or measured beta, and a beta error signal subjected to a gain to form a commanded differential rotor speed signal. The commanded differential rotor speed signal may in turn be compared to a measured or actual differential rotor speed signal, such as the signal on the line 20 of FIG. 1 in order to provide a rate error signal, such as the signal on the line 74 of FIG. 1. The movement of the blades may then be controlled using the rate error signal. Other approaches may also be used.

If the motor or generator signals on the lines 122, 124 were not active but the brake mode signal on the line 120 were active instead, an AND gate 134 will provide a brake path enable signal on a line 136 for enabling the DC machine if the position lock disable request on the line 30 is active at the same time. The electronic engine control unit will use the brake path enable signal on the line 136 to initiate control of the DC machine used as a brake, using a principle of control analogous to that which was described above for the motor.

Returning now to FIG. 4(f), it will be recalled that the fuzzy signal on the line 76a will be an indication of a "belief in class", according to FIG. 4(e), as to the degree of membership of the basis element "motor" and the basis element "brake" in the fuzzy set containing these two basis elements. For instance, if the level of the signal on the line 76a is at 0.25, then the motor will have about a 75 percent membership in the fuzzy set and the brake will have about a 25 percent probability of being in the set. After defuzzifying according to a rule such as the Mean of Max method in block 77, a fuzzification is first carried out, as shown in a block 78a on the input signal on the line 76, for example, as shown according to the fuzzification of FIG. 5(b) to produce a fuzzy set on a line 150a. Assuming the signal on the line 76 is called "x" and is plotted in FIG. 5(b) on the horizontal axis as having a value from left to right of 0 through 1, and, given the example previously described in connection with FIG. 4(e) of the device being at the level of 0.25, which would be used in this case to correspond to x, then the degree of membership of the three basis elements of the fuzzy set on the line 150a, created according to FIG. 5(b), would be about 25 percent "on" and about 75 percent "off", and 0 percent "changing". Thus, the fuzzy set on the line 150a of "off", "changing" and "on" would have memberships of 0.75, 0 and 0.25, respectively, for the example.

Turning to FIG. 5(c), a generalized fuzzeresis process or apparatus is shown including a ruleset block 150b being responsive not only to a fuzzified x input signal or fuzzy set signal on a line 150c, but a feedback signal on a line 152 being representative of an old state of an output signal "y" on a line 154 from the fuzzeresis rule set. The signal on the line 154 would, in this case, correspond to the signal on the line 80 of FIG. 1 and FIG. 4(f). Turning back to FIG. 5(c), a transform block 156 holds the value of the signal on the line 154 for a selected period of time and provides it as the old value on the line 152 some selected period later, even though the signal on the line 154 may have changed in the interim. A fuzzification block 157a is similar to the fuzzifying block 78a of FIG. 4(f), while a defuzzification block 157b is comparable to the defuzzifying block 82 of FIG. 4(f). The fuzzification block 157a is responsive to a crisp "x" input signal on a line 157c for providing the fuzzy set signal on the line 150. Similarly, the defuzzification block 157b is responsive to the signal "y" on the line 154 for providing a crisp signal on a line 157d.

Turning now to FIG. 5(a), a fuzzeresis rule set is shown having six different rules that take into account all the possible combinations of the members of the fuzzy set as fuzzified according to FIG. 5(b) and the old value of the output. As can be seen from the rule set, the fuzzy output value y on the line 154 is determined according to the various rules.

The fuzzeresis construct is a novel method of introducing a form of hysteresis through a fuzzy logic format. The intent of this construct is to mitigate the effects of noise on the motor/brake output discrete signal. This type of approach could have been incorporated directly into the motor/brake mode selection logic 14, but doing so would have complicated that construction considerably. Furthermore, as a separate construct, it can be utilized optionally at any of the discrete output signals (e.g., position lock disable) if the need arises. The need for this type of construction in the present application is to safeguard against ambivalence in making a discrete decision (motor or brake) when noise is present during a transition from motor to brake or brake to motor. The construction is, however, generic in nature and can be applied to any discrete signal with two states, and hence its general description of FIGS. 5(a)–(c) is given in terms of the hypothetical states ON and OFF.

The ruleset contains six rules. Rule 1 states that if input (X) is OFF and is NOT CHANGING then the output (Y) is OFF; likewise Rule 2 states that if the input is ON and is NOT CHANGING then the output is ON. The belief in class of being NOT CHANGING is simply 1 minus the belief in class that it is CHANGING. Hence, the first two rules will transfer the state of the input to the state of the output. The next four rules deal with the case where the input is near the transition area between states ON and OFF (i.e., motor and brake). Rule 3 states that if the input X is ON and CHANGING and the previous output (Y-OLD) was OFF, then the current output Y is also set to OFF; whereas Rule 4 is the analog for the ON state, i.e., if the input X is OFF and CHANGING and the previous output (Y-OLD) was ON, then the current output Y is also set to ON. Rule 5 states that if X is ON and CHANGING and the previous output (Y-OLD) was also ON, then the output should be ON. Analogously, Rule 6 states that if X is off and CHANGING and the previous output (Y-OLD) was also OFF, then the output should be OFF.

Thus it can be seen that Rules, 1, 2, 5 and 6 will have the net effect of passing along the state of the input to the state of the output, i.e., no change. Rules 3 and 4, however, will act to freeze the past state regardless of the input's state. At first these two rules may seem be to be contradictory to Rules 5 and 6 and that they would indefinitely prevent the state from ever changing. This would be a correct observation if we were dealing with ordinary Aristotelian logic and not fuzzy logic. What is important here is to remember that the level of belief in each argument is what will dictate the outcome of the rule through the implication and defuzzification process. Thus when the level of belief of CHANGING is stronger than the level of belief that the input is ON (or OFF), Rules 3 and 4 will dominate, otherwise Rules 5 and 6 will dominate.

It should be noted that the manner of implementation is important for this particular construction, and best results are obtained by using the Bayesian (or product) method for connectives, the Larsen method for implication and the Mean of Max for defuzzification.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Method for disabling a turbine blade position lock for permitting a change in position of the turbine blade, comprising the steps of:

fuzzifying (10a) a first plurality of engine command and condition signals (16, 18, 20, 22, 24) and outputting a first plurality of engine command and condition fuzzy set signals (16a, 18a, 20a, 22a, 24a);

applying a first plurality of fuzzy rules (10b) to the first plurality of command and condition fuzzy set signals, and outputting a position lock disable request fuzzy set signal (26);

defuzzifying (28) the position lock disable request fuzzy set signal (26) and outputting a defuzzified position lock disable request signal (30);

fuzzifying (12a) a second plurality of engine condition signals (40, 46, 52, 54) and outputting a second plurality of engine condition fuzzy set signals (40a, 46a, 52a, 54a);

applying a second plurality of fuzzy rules (12b) to the second plurality of engine condition fuzzy set signals and, in response to the position lock disable request fuzzy set signal (26), outputting a position lock disable fuzzy set signal (60); and defuzzifying (62) the position lock disable fuzzy set signal (60) and outputting a defuzzified position lock disable signal (64) for said disabling said turbine blade position lock for permitting a change in position of said turbine blade.

2. The method of claim 1, further comprising the steps of:

fuzzifying (14a) a third plurality of engine condition signal (70, 72, 74) and outputting a third plurality of engine condition fuzzy set signals (70a, 72a, 74a);

applying a third plurality of fuzzy rules (14b) to the third plurality of engine condition fuzzy set signals and outputting a device fuzzy set signal (76a); and defuzzifying (77) the device fuzzy set signal (76a) and outputting a defuzzified device output signal (76) indicative of a selection between a motor mode and a brake mode.

3. The method of claim 2, further comprising the steps of:

fuzzifying (78a) the defuzzified device output signal (76) and outputting a fuzzeresis fuzzy set signal (150a);

applying a fuzzeresis rule set (150) to the fuzzeresis fuzzy set signal (150a) and to the old fuzzeresified device output fuzzy set signal (152a) and outputting a fuzzeresified device output fuzzy set signal (80); and defuzzifying (82) the fuzzeresified device fuzzy set signal (80) and outputting a device signal (84).

4. The method of claim 3, further comprising the steps of:

receiving the device signal (84) and a fourth plurality of engine condition signals (74, 88) for determining a state from between a motor state (87a) and a brake state (87b) and outputting a brake mode signal (120) in the presence of the brake state and a motor mode signal in the presence of the motor state wherein the motor mode signal is selected from between a motoring mode signal (122) and a regenerative mode signal (124); and outputting a selected one of
 (1) a motor path enable signal (132) in response to the position lock disable request signal (30) and one of the motor mode signal (122) and the regenerative mode signal (124); and
 (2) a brake path enable signal (136) in response to the brake mode signal (120) and the position lock disable request signal (30).

5. Apparatus for disabling a blade position lock for permitting a change in position of the blade, comprising:

a first fuzzifier (10a) for fuzzifying a first plurality of engine command and condition signals (16, 18, 20, 22, 24) for outputting a corresponding first plurality of engine command and condition fuzzy set signals (16a, 18a, 20a, 22a, 24a);

means (10b) for applying a first plurality of fuzzy rules to the first plurality of command and condition fuzzy set signals, for outputting a position lock disable request fuzzy set signal (26);

a first defuzzifier (28) for defuzzifying the position lock disable request fuzzy set signal (26) for outputting a defuzzified position lock disable request signal (30);

a second fuzzifier (12a) for fuzzifying a second plurality of engine condition signals (40, 46, 52, 54) for outputting a corresponding second plurality of engine condition fuzzy set signals (40a, 46a, 52a, 54a);

means (12b) for applying a second plurality of fuzzy rules to the second plurality of engine condition fuzzy set signals and to the position lock disable request fuzzy set signal (26) for outputting a position lock disable fuzzy set signal (60); and a second defuzzifier (62) for defuzzifying the position lock disable fuzzy set signal (60) for outputting a position lock disable signal (64) for said disabling said blade position lock for permitting said change in position of said blade.

6. The apparatus of claim 5, further comprising:

a third fuzzifier (14a) for fuzzifying a third plurality of engine condition signal (70, 72, 74) for outputting a corresponding third plurality of engine condition fuzzy set signals (70a, 72a, 74a);

means (14b) for applying a third plurality of fuzzy rules to the third plurality of engine condition fuzzy set signals, for outputting a device fuzzy set signal (76a); and a third defuzzifier (77) for defuzzifying the device fuzzy set signal (76a) for outputting a device output fuzzy set signal (76) indicative of a selection between a motor mode and a brake mode.

7. The apparatus of claim 6, further comprising:

a fourth fuzzifier (78a) for fuzzifying the device output signal (76) for outputting a fuzzeresis fuzzy set signal (150a);

means (150) for applying a fuzzeresis rule set to the fuzzeresis fuzzy set signal (150a) and to an old fuzzeresified device output fuzzy set signal (152a), for outputting a fuzzeresified device output fuzzy set signal (80); and a fourth defuzzifier (82) for defuzzifying the fuzzeresified device output fuzzy set signal (80), for outputting a device signal (84).

8. The apparatus of claim 7, further comprising:

means for receiving the device signal (84) and a fourth plurality of engine condition signals (74, 88) for determining a state from between a motor state (87a) and a brake state (87b) for outputting a brake mode signal (120) in the presence of the brake state and a motor mode signal in the presence of the motor state wherein the motor mode signal is selected from between a motoring mode signal (122) and a regenerative mode signal (124); and means for outputting a selected one of:
 (1) a motor path enable signal (132) in response to the position lock disable request signal (30) and one of the motor mode signal (122) and the regenerative mode signal (124); and
 (2) a brake path enable signal (136) in response to the brake mode signal (120) and the position lock disable request signal (30).

\* \* \* \* \*